(12) United States Patent
Ribeiro et al.

(10) Patent No.: US 8,554,200 B2
(45) Date of Patent: Oct. 8, 2013

(54) METHOD AND APPARATUS FOR PROVIDING INTERFERENCE MEASUREMENTS FOR DEVICE TO-DEVICE COMMUNICATION

(75) Inventors: Cassio Ribeiro, Espoo (FI); Juha Korhonen, Espoo (FI); Pekka Janis, Espoo (FI); Klaus Doppler, Espoo (FI); Carl Wijting, Helsinki (FI); Olav Tirkkonen, Helsinki (FI); Klaus Hugl, Helsinki (FI)

(73) Assignee: Nokia Corporation, Espoo (FI)

( * ) Notice: Subject to any disclaimer, the term of this patent is extended or adjusted under 35 U.S.C. 154(b) by 741 days.

(21) Appl. No.: 12/558,463

(22) Filed: Sep. 11, 2009

(65) Prior Publication Data

US 2010/0093364 A1  Apr. 15, 2010

Related U.S. Application Data

(60) Provisional application No. 61/096,580, filed on Sep. 12, 2008.

(51) Int. Cl.
*H04W 24/00* (2009.01)

(52) U.S. Cl.
USPC ........ 455/424; 455/422.1; 455/450; 455/522; 455/501; 455/63.1; 455/67.13

(58) Field of Classification Search
USPC ......... 370/329, 252, 335, 310, 280, 347, 255, 370/342; 455/450, 422.1, 63.1, 77, 561, 455/509, 425
See application file for complete search history.

(56) References Cited

U.S. PATENT DOCUMENTS

| | | | |
|---|---|---|---|
| 7,548,758 B2 | 6/2009 | Periyalwar et al. | |
| 2004/0017792 A1* | 1/2004 | Khaleghi et al. | 370/335 |
| 2004/0043783 A1 | 3/2004 | Anderson | |
| 2005/0163070 A1 | 7/2005 | Farnham et al. | |
| 2006/0280160 A1* | 12/2006 | Padovani et al. | 370/347 |
| 2007/0189234 A1* | 8/2007 | Heo et al. | 370/335 |
| 2007/0298728 A1* | 12/2007 | Imamura et al. | 455/77 |
| 2008/0031193 A1 | 2/2008 | Laroia et al. | |
| 2008/0057934 A1* | 3/2008 | Sung et al. | 455/422.1 |
| 2008/0069033 A1 | 3/2008 | Li et al. | |
| 2008/0076433 A1 | 3/2008 | Cheng et al. | |

(Continued)

FOREIGN PATENT DOCUMENTS

WO  WO 2007/082035 A2  7/2007

OTHER PUBLICATIONS

Doppler, K., et al.: Innovative Concepts in Peer-to-Peer and Network Coding. Version: 1.0, Last Updated: Jan. 16, 2009, pp. 1-25, http://projects.celtic-initiative.org/winner+/WINNER+%20Deliverables/D1.3_v1.pdf.

(Continued)

*Primary Examiner* — Joseph Arevalo
(74) *Attorney, Agent, or Firm* — Ditthavong Mori & Steiner, P.C.

(57) ABSTRACT

An approach for providing interference measurements for device-to-device communication is disclosed. A logic generates a control signal to instruct a plurality of stations to perform measurement relating to interference or path loss by the stations. The logic then receives measurement information from the stations and determines, based on the measurement information, whether resources are to be scheduled to provide direct communication between two of the stations.

17 Claims, 15 Drawing Sheets

(56) References Cited

U.S. PATENT DOCUMENTS

| | | | |
|---|---|---|---|
| 2008/0219214 A1* | 9/2008 | Chen et al. | 370/331 |
| 2008/0253300 A1* | 10/2008 | Wakabayashi et al. | 370/252 |
| 2009/0010186 A1* | 1/2009 | Li et al. | 370/310 |
| 2009/0016278 A1* | 1/2009 | Wakabayashi | 370/329 |
| 2009/0046573 A1* | 2/2009 | Damnjanovic | 370/216 |
| 2009/0061886 A1* | 3/2009 | Cozzo et al. | 455/450 |
| 2009/0109907 A1* | 4/2009 | Tsai et al. | 370/329 |
| 2009/0253421 A1 | 10/2009 | Camp, Jr. et al. | |
| 2010/0029211 A1* | 2/2010 | Teague | 455/63.1 |
| 2010/0135238 A1* | 6/2010 | Sadri et al. | 370/329 |
| 2010/0290548 A1* | 11/2010 | Hoshino et al. | 375/260 |
| 2011/0002284 A1* | 1/2011 | Talwar et al. | 370/329 |
| 2011/0003599 A1* | 1/2011 | Kanzaki et al. | 455/452.2 |
| 2011/0021239 A1* | 1/2011 | Wakabayashi et al. | 455/522 |
| 2011/0116410 A1* | 5/2011 | Sung et al. | 370/252 |

OTHER PUBLICATIONS

Janis, P., et al.: Interference-aware Resource Allocation for Device-to-Device Radio Underlaying Cellular Networks. pp. 1-5, ftp://lenst.det.unifi.it/pub/LenLar/proceedings/2009/vtc09/DATA/09-04-05.PDF.

Lei, J., Fu, X.: Interest-Based Peer-to-Peer Group Management (Abstract). Lecture Notes in Computer Science, vol. 5630/2009, http://www.springerlink.com/content/d2m175n30wp65508/.

Final Rejection for related U.S. Appl. No. 12/455,644 dated Jan. 27, 2012, pp. 1-27.

* cited by examiner

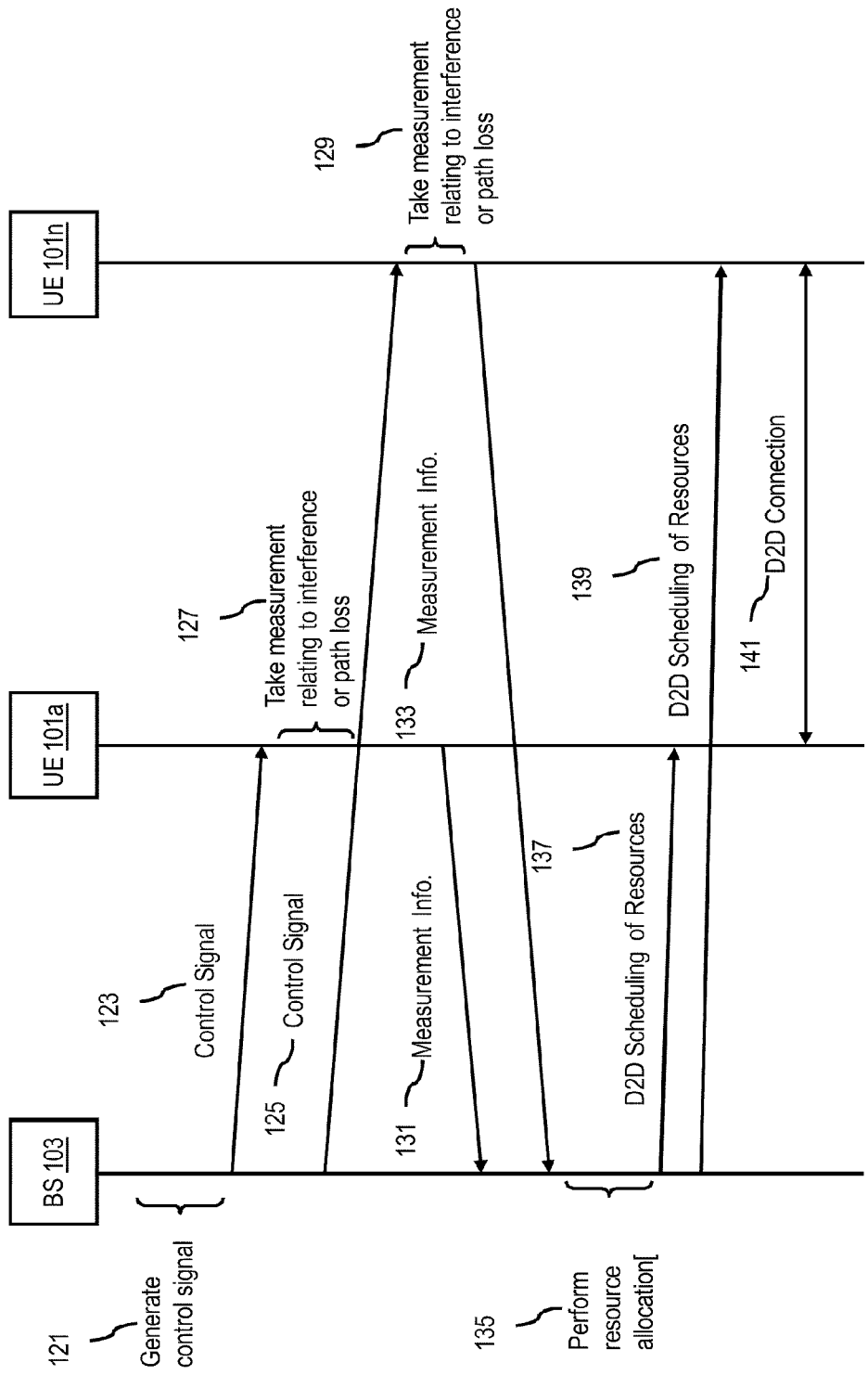

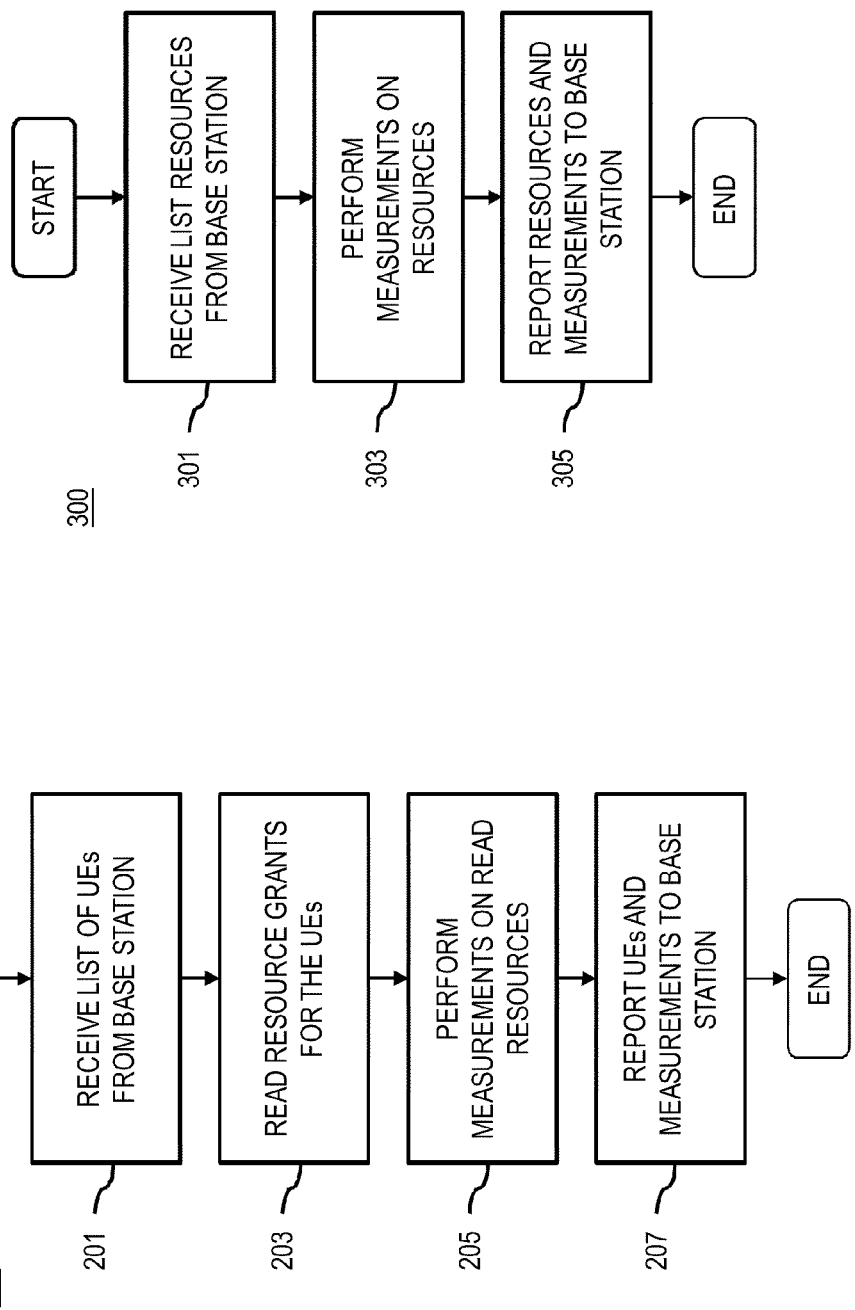

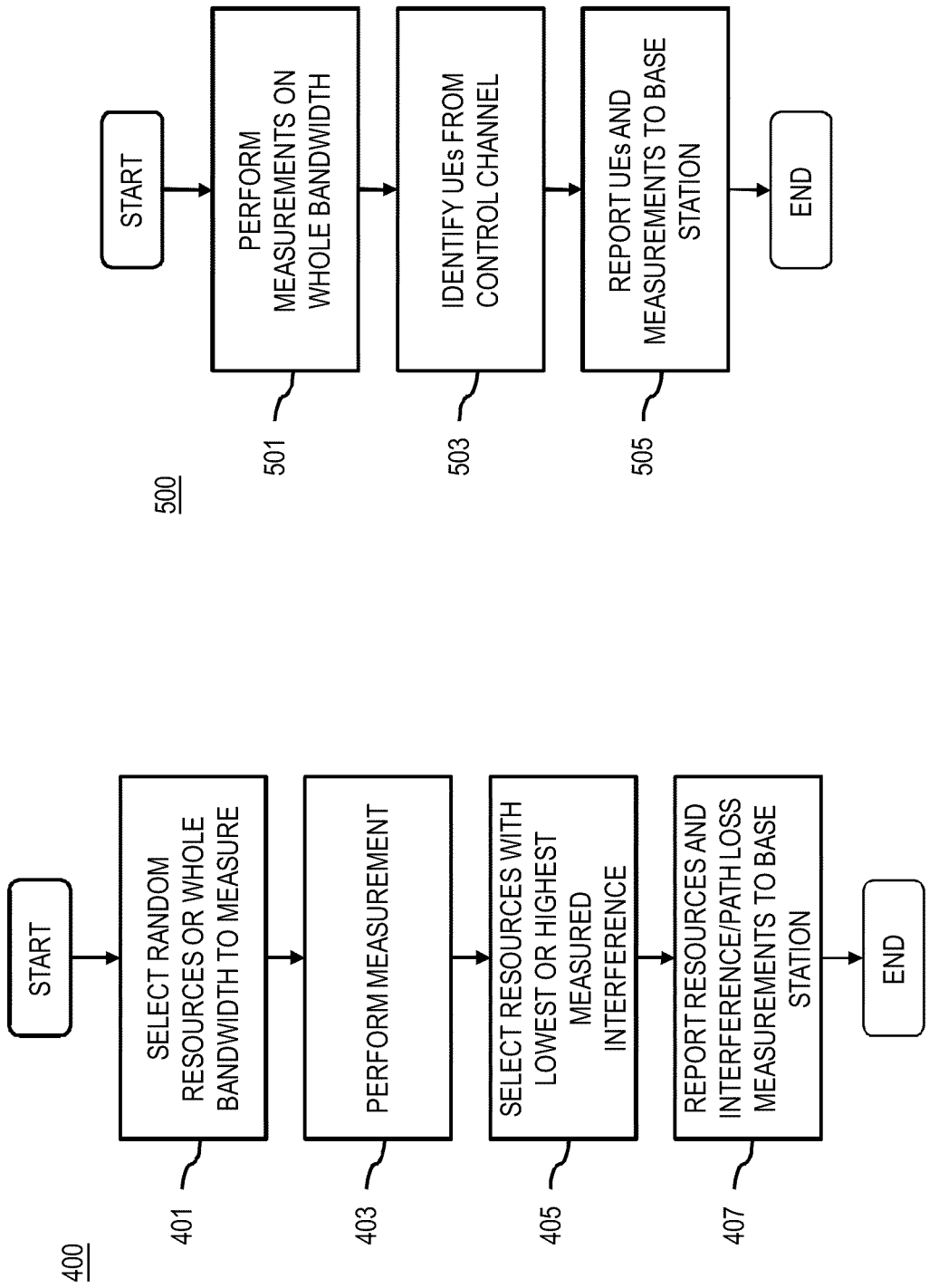

METHOD AND APPARATUS FOR
PROVIDING INTERFERENCE
MEASUREMENTS FOR DEVICE TO-DEVICE
COMMUNICATION

RELATED APPLICATIONS

This application claims the benefit of the earlier filing date under 35 U.S.C. §119(e) of U.S. Provisional Application Ser. No. 61/096,580 filed Sep. 12, 2008, entitled "Method and Apparatus for Providing Interference Measurements for Device-to-Device Communication," the entirety of which is incorporated herein by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves ensuring minimal or no signal interference among user terminals, while observing the constraints of network resources. For example, device-to-device (D2D) communication can utilize the same resources with a cellular network; and hence, there is a need to coordinate the D2D and cellular communication to optimize the use of resources as to offer guaranteed service levels to the users in the cellular network and minimize the interference between the cellular users and D2D communication.

Therefore, there is a need for an approach for efficiently utilizing network resources while minimizing interference.

SOME EXAMPLE EMBODIMENTS

According to one embodiment, a method comprises generating a control signal to instruct a plurality of stations to perform measurement relating to interference or path loss by the stations. The method also comprises receiving measurement information from the stations. The method further comprises determining, based on the measurement information, whether resources are to be scheduled to provide direct communication between two of the stations.

According to another embodiment, a computer-readable medium carries one or more sequences of one or more instructions which, when executed by one or more processors, cause an apparatus to generate a control signal to instruct a plurality of stations to perform measurement relating to interference or path loss by the stations. The apparatus is also caused to receive measurement information from the stations. The apparatus is further caused to determine, based on the measurement information, whether resources are to be scheduled to provide direct communication between two of the stations.

According to another embodiment, an apparatus comprises a logic configured to generate a control signal to instruct a plurality of stations to perform measurement relating to interference or path loss by the stations. The apparatus is also caused to receive measurement information from the stations. The apparatus is further caused to determine, based on the measurement information, whether resources are to be scheduled to provide direct communication between two of the stations.

According to another embodiment, an apparatus comprises means for generating a control signal to instruct a plurality of stations to perform measurement relating to interference or path loss by the stations. The apparatus also comprises means for receiving measurement information from the stations. The apparatus further comprises means for determining, based on the measurement information, whether resources are to be scheduled to provide direct communication between two of the stations.

According to another embodiment, a method comprises receiving a control signal from a base station. The method also comprises performing measurement of interference or path loss in response to the control signal. The method further comprises initiating transmission of measurement information to the base station. The method further comprises receiving a resource allocation message specifying whether resources can be utilized to establish a direct connection to a user equipment.

According to another embodiment, a computer-readable medium carries one or more sequences of one or more instructions which, when executed by one or more processors, cause an apparatus to receive a control signal from a base station. The apparatus is also caused to perform measurement of interference or path loss in response to the control signal. The apparatus is further caused to initiate transmission of measurement information to the base station. The apparatus is further caused to receive a resource allocation message specifying whether resources can be utilized to establish a direct connection to a user equipment.

According to another embodiment, an apparatus comprises a logic configured to receive a control signal from a base station. The apparatus is also caused to perform measurement of interference or path loss in response to the control signal. The apparatus is further caused to initiate transmission of measurement information to the base station. The apparatus is further caused to receive a resource allocation message specifying whether resources can be utilized to establish a direct connection to a user equipment.

According to yet another embodiment, an apparatus comprises means for receiving a control signal from a base station. The apparatus also comprises means for performing measurement of interference or path loss in response to the control signal. The apparatus further comprises means for initiating transmission of measurement information to the base station. The apparatus further comprises means for receiving a resource allocation message specifying whether resources can be utilized to establish a direct connection to a user equipment.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 1A and 1B are, respectively, a diagram of a communication system capable of providing interference sensing, and a signaling diagram of the interference sensing process, according to an exemplary embodiment;

FIG. 2 is a flowchart of a process for performing interference and path loss measurements based on a list of UEs, according to an exemplary embodiment;

FIG. 3 is a flowchart of a process for performing interference and path loss measurements based on a list of resources, according to an exemplary embodiment;

FIG. 4 is a flowchart of a process for minimizing measurement signaling by measuring random or all resources, according to an exemplary embodiment;

FIG. 5 is a flowchart of a process for correlating measurements with UEs by identifying the UEs from a control channel, according to an exemplary embodiment;

DESCRIPTION OF SOME EMBODIMENTS

An apparatus, method, and software for interference sensing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with the Third Generation Partnership Project (3GPP) Long Term Evolution (LTE) architecture, it is recognized by one of ordinary skill in the art that the embodiments of the inventions have applicability to any type of communication system and equivalent functional capabilities.

Figure 1A:
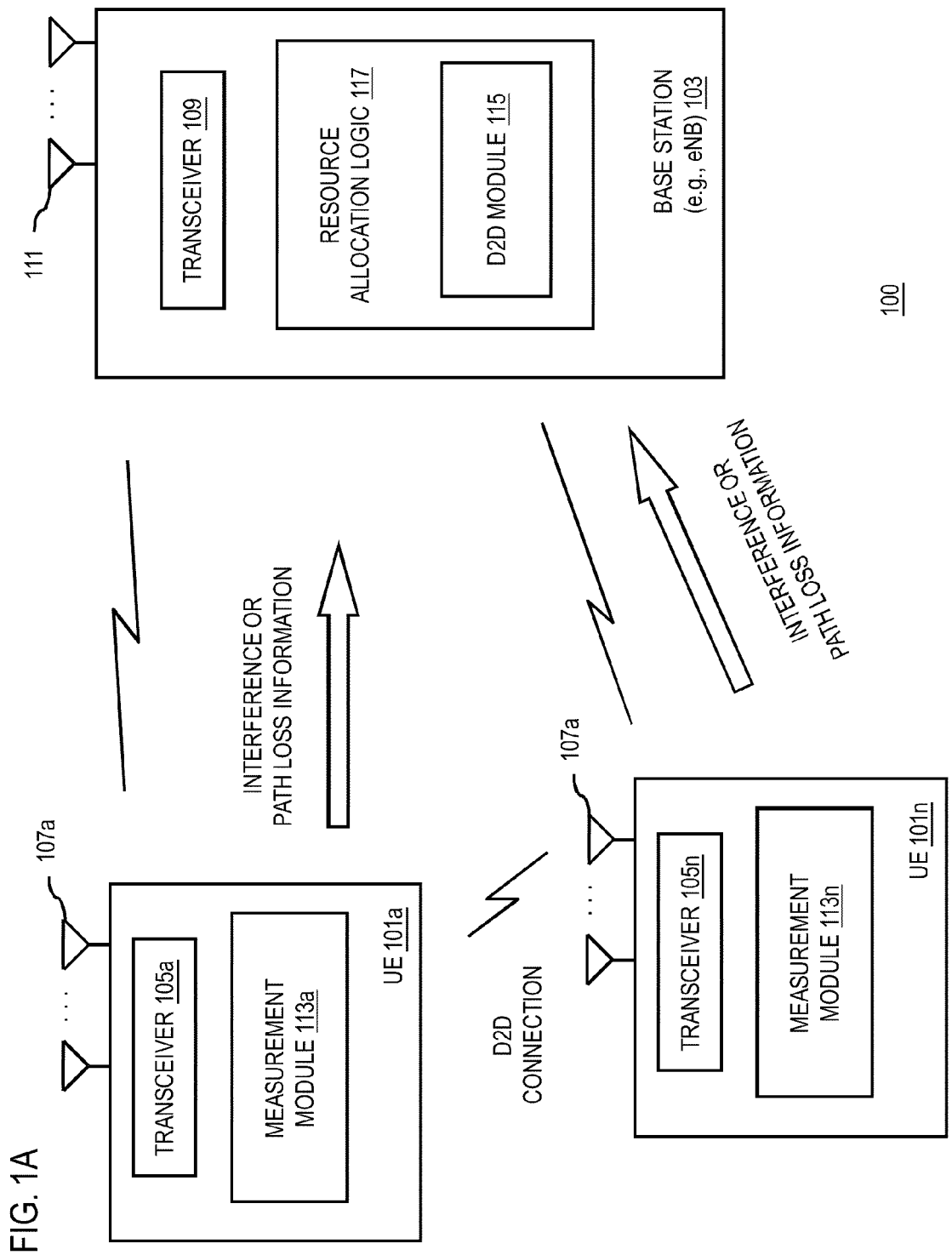

FIGS. 1A and 1B are, respectively, a diagram of a communication system capable of providing interference sensing, and a ladder diagram of the interference sensing process, according to an exemplary embodiment. As shown in FIG. 1A, a communication system 100 includes one or more user equipment (UEs) 101a-101n communicating with a base station 103, which is part of an access network (e.g., 3GPP LIE or E-UTRAN, etc.). Under the 3GPP LIE architecture (as shown in FIGS. 10A-10D), the base station 103 is denoted as an enhanced Node B (eNB). The UEs 101a-101n can be any type of mobile stations, such as handsets, terminals, stations, units, devices, multimedia tablets, Internet nodes, communicators, Personal Digital Assistants (PDAs) or any type of interface to the user (such as "wearable" circuitry, etc.). The UEs 101a-101n each include a transceiver 105 (e.g., transceivers 105a and 105n) and an antenna system 107 (e.g., antenna system 107a and 107n) that couples to the transceiver 105 to receive or transmit signals from the base station 103. The antenna system 107 can include one or more antennas. For the purposes of illustration, the time division duplex (TDD) mode of 3GPP is described herein; however, it is recognized that other modes can be supported, e.g., frequency division duplex (FDD).

As with the UE 101, the base station 103 employs a transceiver, which transmits information to the UE 101. Also, the base station 103 can employ one or more antennas for transmitting and receiving electromagnetic signals. For instance, the Node B 103 may utilize a Multiple Input Multiple Output (MIMO) antenna system 111, whereby the Node B 103 can support multiple antenna transmit and receive capabilities. This arrangement can support the parallel transmission of independent data streams to achieve high data rates between the UE 101 and Node B 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

As seen, the UEs 101a-101n can also establish device-to-device (D2D) communication, in addition to communicating over the system 100. It is assumed that the base station 103 assigns resources separately for each group of UEs 101a-101n requesting D2D communication. In the approach described herein, resource scheduling of the base station 103 to cellular users can utilize knowledge of the interference levels or path loss estimates between UEs 101a-101n engaged in D2D communication and UEs 101a-101n engaged in cellular communication on the same network. As used herein, path loss is defined to include: (i) distance-dependent path loss, (ii) shadow fading, (iii) antenna gains, and (iv) penetration loss—exclusive of fast fading. For example, the base station 103 can attempt to schedule the cellular communication on resources with low interference from and to UEs 101a-101n engaged in D2D communication. The base station 103 can also schedule the D2D groups on resources with low interference from and to UEs 101a-101n engaged in cellular communication.

In network scenarios with high site density, the uplink sector throughput is limited by the rise of interference, and not by the UE 101 transmit power. By way of example, one approach of controlling inter-cell interference is to only compensate for a fraction of the path loss (fractional power control in LTE). The fractional power control algorithm involves trading off the throughput of a particular UE 101 and that of the other UEs 101. Compared with other conventional approaches, this approach allows for more power for UEs 101 whose path loss is small—i.e., UEs 101 situated close to the base station 101 because these UEs 101 generate little inter-cell interference. However, the extent to which transmit power can be increased without penalizing other users on the network (e.g., other UEs 101) is not explicitly taken into account. If the UE 101 can also estimate path loss to all interfering entities (e.g., other UEs 101), an estimate of how much interference in other sectors or cell in total can be determined. When the UE 101 transmit power increases, the corresponding interference also increases—but due to the background noise floor, the effect on signal to interference ratio (SINR) of a transmit power increase depends on the absolute path loss to the base station 103 being interfered.

If, for example, D2D communication takes place on uplink (UL) resources, interference caused by D2D communication can be limited by applying power back-off relative to the normal UL transmission directed to the base station 103. However, interference measurements would be needed in order to find out, on one hand, which cellular UEs 101 would produce so much interference to the D2D receiver that they could not be scheduled on the same resources with the D2D users or, on the other hand, which cellular UEs 101 would produce so little interference to the D2D receiver that they should be scheduled on the same resources with the D2D users.

If D2D communication employ downlink (DL) resources, interference measurements are important in order to find out those UEs 101 that would be interfered by the D2D communication.

It is recognized that defining a system for estimating path loss or interference between the cellular and D2D users can be problematic. Further, it is noted that there are several standards that support D2D operation in the same band as the base station 103, access point, and/or central controller. For example, in Hiperlan 2, Tetra and WiMAX systems, interference is of no concern, because D2D communication happens on resources that are not used for other transmission. In wireless local area network (WLAN) ad-hoc and direct link modes, the D2D communication utilizes the same resources as communication that occurs through access points. However, the access points are not coordinating resources. Instead, resource reservation is based on beacons and sensing of free resources. All the nodes of the WLAN thus apply the same contention based carrier sensing multiple access scheme.

Communications between the UE 101 and the base station 103 (and thus, the network) is governed, in part, by control information exchanged between the two entities. Such control information, in an exemplary embodiment, is transported over a control channel on, for example, the downlink from the base station 103 to the UE 101.

By way of example, a number of communication channels are defined for use in the system 100. The channel types include: physical channels, transport channels, and logical channels. For instance in LIE system, the physical channels include, among others, a Physical Downlink Shared channel (PDSCH), Physical Downlink Control Channel (PDCCH), Physical Uplink Shared Channel (PUSCH), and Physical Uplink Control Channel (PUCCH). The transport channels can be defined by how they transfer data over the radio interface and the characteristics of the data. In LIE downlink, the transport channels include, among others, a broadcast channel (BCH), paging channel (PCH), and Down Link Shared Channel (DL-SCH). In LIE uplink, the exemplary transport channels are a Random Access Channel (RACH) and UpLink Shared Channel (UL-SCH). Each transport channel is mapped to one or more physical channels according to its physical characteristics.

Each logical channel can be defined by the type and required Quality of Service (QoS) of information that it carries. In LTE system, the associated logical channels include, for example, a broadcast control channel (BCCH), a paging control channel (PCCH), Dedicated Control Channel (DCCH), Common Control Channel (CCCH), Dedicated Traffic Channel (DTCH), etc.

In LTE system, the BCCH (Broadcast Control Channel) can be mapped onto both BCH and DL-SCH. As such, this is mapped to the PDSCH; the time-frequency resource can be dynamically allocated by using L1/L2 control channel (PDCCH). In this case, BCCH (Broadcast Control Channel)-RNTI (Radio Network Temporary Identities) is used to identify the resource allocation information.

To ensure accurate delivery of information between the eNB 103 and the UE 101, the system 100 utilizes error detection in exchanging information, e.g., Hybrid ARQ (HARQ). HARQ is a concatenation of Forward Error Correction (FEC) coding and an Automatic Repeat Request (ARQ) protocol. Automatic Repeat Request (ARQ) is an error detection mechanism used on the link layer. As such, this error detection scheme, as well as other schemes (e.g., CRC (cyclic redundancy check)), can be performed by error detection modules and within the eNB 103 and UE 101, respectively. The HARQ mechanism permits the receiver (e.g., UE 101) to indicate to the transmitter (e.g., eNB 103) that a packet or sub-packet has been received incorrectly, and thus, requests the transmitter to resend the particular packet(s).

In the system 100, the base station 103 determines the UE 101 to UE 101 path loss or expected level of interference by requesting the devices to perform interference power measurements. The path loss or interference estimates (as determined via the measurement modules (e.g. measurement modules 113*a* and 113*n*) are used for coordinating the D2D and cellular transmission on the same band. The coordination can be performed using a D2D module 115 within a resource allocation logic 117 and includes several approaches.

As shown in FIG. 1B, the base station 103 can instruct UEs 101*a* and 101*n* to take measurements relating to interference or path loss by generating a control signal (step 121) and transmitting it to the UE 101*a* (step 123) and the UE 101*n* (step 125). On receipt of the control signal, the UE 101*a* (step 127) and the UE 101*n* (step 129) each take measurements relating to interference or path loss over the network. By way of example, the measurement can be performed over randomly selected resources or all the resources of the network. The measurement information may also include relative power with respect to one of the UEs 101 or relative power with respect to a link power. These measurements are then transmitted to the base station 103 (steps 131 and 133). In one embodiment, the interference measurements are reported to the base station 103 so that the base station can perform resource allocation relating to the D2D communication (step 135). In other words, the measurement information (e.g., path loss or interference estimates) can be used for deciding if D2D communication needs dedicated resources or if the D2D communication can take place on resources that are used also for cellular communication. It is noted that interference estimates may be more readily obtainable than path loss estimates, as path loss estimates require the UE 101 to have knowledge of the transmitted signal power.

In one embodiment, the path loss or interference estimates can be utilized for determining whether D2D communication should share UL or DL resources. If D2D communication takes place on UL resources, the path loss or interference estimates can be used for scheduling the D2D and cellular communication such that the interference experienced by the D2D communication due to cellular communication is minimized. Accordingly, D2D communication avoids UL frequency and time resources that are scheduled for nearby UEs 101 for cellular communication. If D2D communication takes place on DL resources, the path loss or interference estimates can be used for scheduling of the resources such that the interference caused by the D2D communication to the cellular communication is minimized. This means that D2D communication is scheduled on such DL resources that are not received by the nearby cellular UEs 101. Furthermore, the measurements can be used also for determining whether two UEs 101 are at such proximity that D2D connection between them is sensible (i.e., practical). In the example of FIG. 1B, the base station 103 determines based on the measurement information to scheduling of resources for D2D communication between the UE 101a and UE 101n (steps 137 and 139). In one embodiment, if the base station 103 determines that measurement information is not available from the either the UE 101a or UE 101n, the base station may instruct the UE 101a or UE 101n with no measurement information to use a dedicate resource to establish a D2D connection. In response, the UE 101a and 101n establish a D2D connection using the scheduled resources (step 141).

There are several options for arranging the interference measurements, as next described with respect to FIGS. 2-5.

FIG. 2 is a flowchart of a process for performing interference and path loss measurements based on a list of UEs, according to an exemplary embodiment. In one embodiment, the process of 200 of FIG. 2 is performed by the UE 101. In step 201, the UE 101 receives a list of UE identities from the base station on which to perform interference and path loss measurements. By way of example, when requesting interference measurements to be performed by the UE 101, the base station 103 provides a list of UE 101 identities. In an exemplary embodiment, the UE 101 identities are Cell Radio Network Temporary Identifiers (CRNTIs), within an LIE system. Under this scenario, the UE 101 receiving the list can search on or read the DL control channel for UL resource grants for the listed UEs 101 (step 203). This searching, particularly in a LIE system, uses minimal additional processing for the active UEs 101, as these listed UEs 101 are checking the control channel for their own UL or DL grants anyhow. Because the grants can be addressed by masking cyclic redundancy check (CRC) words with CRNTIs, simultaneously checking grants for the listed UEs 101 does not entail unreasonable additional decoding load (e.g., simply involving one XOR operation of the length of CRNTI for each listed UE identity).

In one embodiment, if the UE 101 that is performing the measurements is following, e.g., a discontinuous reception (DRX) cycle, the UE 101 can be moved to the mode of continuous reception to perform measurements without delay. When the UE 101 finds an UL grant with a listed UE 101 identity, the UE 101 measures, for instance, the power density or, alternatively, the pilot power density over the resource indicated in the grant (step 205). It is contemplated that the UE 101 may also measure any other parameter indicative of interference or path loss. The UE 101 then reports the measurements and corresponding UEs 101 from which the measurements were taken to the base station (step 207). After receiving the measurement reports, the base station 103, for instance, determines the scheduling restrictions that ensure sufficiently suppressed interference between the cellular and D2D communication.

In certain embodiments, the receiving UE's ability to measure absolute power is rather limited and, depending on the power level, up to 10 dB errors are allowed. Therefore, in one embodiment, the power density measurements are provided in relative terms, such that receiving UE 101 reports the power densities relative to the power of the first of the listed UEs 101 or relative to the power received in the D2D communication (if that is already ongoing) or relative to the received downlink power of the base station 103.

FIG. 3 is a flowchart of a process for performing interference and path loss measurements based on a list of resources, according to an exemplary embodiment. In one embodiment, the process 300 of FIG. 3 is performed by the UE 101. With respect to FIG. 3, instead of signaling the list of UE 101 identities, the base station 103 can provide a list of resources on which the UE 101 should perform the measurements. Accordingly, at step 301, the UE 101 receives the list of resources from the base station. Under this approach, the base station 103 schedules, in the case of the UL, the UL transmission to the listed resources for a number of UEs 101 in a certain subframe during which the receiving UE 101 makes the measurements. In contrast to the approach involving the list of UE identities, there is a scheduling restriction that all the UEs 101 associated with the listed resources should transmit on some frequency resource at least in one subframe during a reasonably short period, e.g., 10-20 ms. Next, the receiving UE 101 performs the measurements on the listed resources (step 303). As described with respect to FIG. 2, these measurements include, for instance, the power density or, alternatively, the pilot power density over the listed resource. The UE 101 then reports the measurements along with the listed resources to the base station 103 (step 305). The base station 103 then uses the interference and path loss measurements to determine whether resources are to be scheduled to provide direct communication between, for instance, two of the UEs 101 associated with the listed resources.

In certain embodiments, if is the processes of FIGS. 2 and 3 are utilized, the base station 103 can reduce the measurement and signaling load by leaving out those UEs 101 that are known to be sufficiently far away so that there would be no risk of interference. This determination of sufficiency in proximity and level of interference can be set using predetermined values (e.g., based on historical and/or simulated data). Also, there may be no need for measurements on those "close" UEs 101 that would suffer significant interference by their proximity.

FIG. 4 is a flowchart of a process for minimizing measurement signaling by measuring random or all resources, according to an exemplary embodiment. In one embodiment, the process 400 of FIG. 4 is performed by the UE 101. Under some scenarios, the signaling load may increase in the link where measurements are reported (e.g., UL) because the UEs 101 would more likely do unnecessary measurements. For example, the measurements may be unnecessary if multiple UEs 101 are performing measurements on the same resources or communication links. Also, there may be a longer time delay until all relevant UEs 101 have been measured; meanwhile the base station 103 would have incomplete information about interfering UEs 101. In addition, since the allocated frequency band cannot be assumed to be constant, synchronizing to the pilot signals for accurate measurements would be difficult (if not impossible). Therefore, in one embodiment, instead of reporting all measurements, the measuring UE 101 reports only the best observed frequency blocks (with least interference), the worst observed frequency blocs (with highest interference), or both, thereby reducing signaling associated with measurement reporting.

Accordingly, at step 401, the measuring UE 101 selects either a random selection of resources or the entire resource bandwidth to measure (step 401). In most cases, selecting a random selection is sufficient because the UE 101 will only be reporting either the best or worst interfering measurements. The UE 101 then performs measurements (e.g., relative power, etc.) on the selected resources (step 403). The measurements are then evaluated to determine the highest or lowest levels of interference associated with the measured resources (step 405). The UE 101 then reports the selected measurements to the base station 103 (step 407). For example, if the base station 103 receives measurement information on the lowest measured interference, the base station 103 will know that the corresponding resources can support D2D communication. Conversely, if the base station 103 receives measurement information on the high measured interference, the base station 103 will that the corresponding resources cannot support D2D communication and that dedicated resources should be allocated instead.

FIG. 5 is a flowchart of a process for correlating measurements with UEs by identifying the UEs from a control channel, according to an exemplary embodiment. In one embodiment, the process 500 is performed by the UE 101. At step 501, the UE 101 performs interference and path loss measurements on the entire bandwidth resource. In this example, the UE 101 performs the measurements without knowing which specific other UEs 101 are using a particular resource or portion of the bandwidth. To correlate specific UEs 101 with the measurements, the measuring UE 101 identifies the UEs from an associated control channel (step 503). By way of example, in LTE, the UE 101 can read the other UE's resource allocations from the control channel if the UE knows the other UE's CRNTI. In other embodiments, knowledge of the CRNTI is not necessary for reading the control channel, and the UE 101 can identify the other UE's resource allocations from the control channel without the CRNTI. After identifying each UE 101 corresponding to the measurements, the measuring UE 101 reports the both the UE 101 identities and the measurements to the base station 103 (step 505).

In the above processes of FIG. 2-5, according to one embodiment, the base station 103 can continually update a table of UE 101 to UE 101 interference estimates so that when a D2D connection is needed, the optimal coordination scheme would be immediately available. The measurements may also be initiated only after D2D connection is requested. This would not necessarily entail any delay, but D2D communication could be started on a dedicated resource, and optimization would be performed after measurements.

From the perspective of the base station 103, measurement reports and interference coordination can be executed in a variety of ways. One approach to overcome the UE's limitation in measuring absolute powers is to perform relative measurements. For example, if the UE 101 already has an ongoing D2D connection, the UE 101 can measure the power received by the other UEs 101 relative to power received on the D2D connection. Where a D2D connection is yet not established, measurements values can be relative to, for instance, the received power on the downlink control channel.

Under the scenario in which measurements are performed during UL transmissions, the physical layer technology utilized in the UL may be taken into account. As mentioned, in LTE, UE 101 transmissions use SC-FDMA, while UEs 101 are equipped with OFDMA receivers only. No substantial modifications are necessary at the UE 101 side to implement the approach described herein, since actual decoding of the UL transmission is not needed, and power measurements can be performed using the standard OFDMA receiver. Even for pilot power measurements the UE 101 need only know the pilot sequence of the UEs 101 in question.

In fact, the measuring UE 101 need not report precise measurements to the base station 103, but rather an indication of which UEs 101 generate more interference. Such indication can be quantized to a small set of values, for example {0, 1, 2, 3}, where 0 indicates no interference and 3 indicates high interference. Alternatively, 1 bit indication can be used to differentiate UEs causing low interference from the ones causing large interference.

Figure 6:
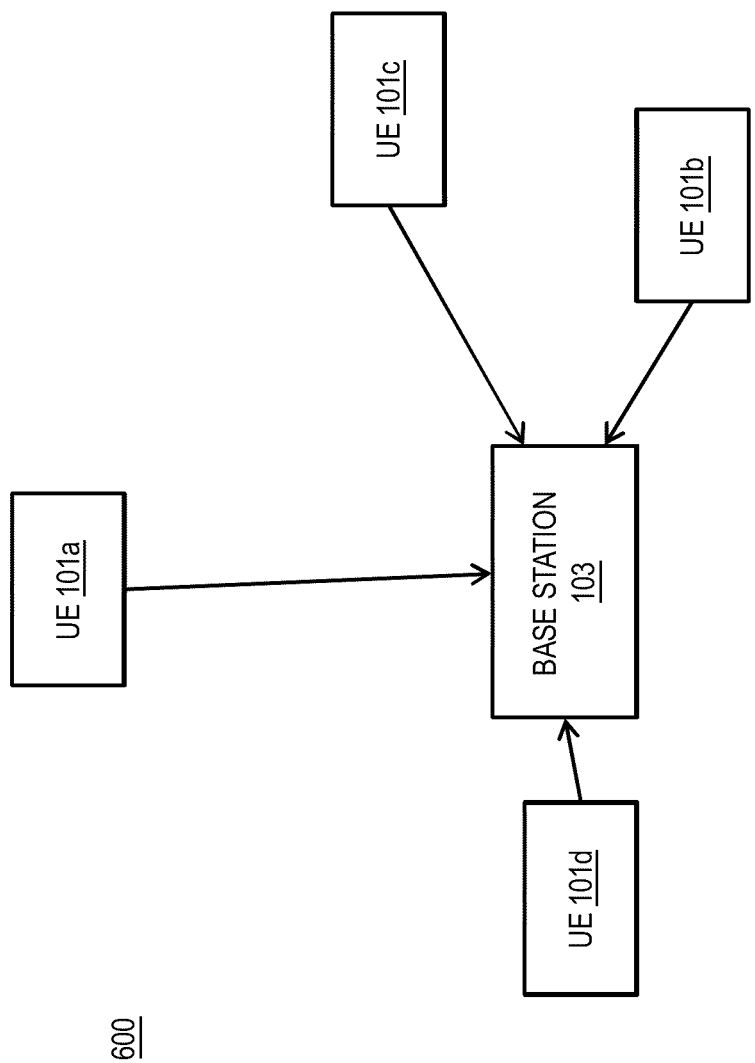
FIG. 6 is a diagram of an exemplary communication system in which the user equipment are influenced by power control on interference measurements, according to an exemplary embodiment.

FIG. 6 is a diagram of an exemplary communication system in which the user equipment are influenced by power control on interference measurements, according to an exemplary embodiment. In one embodiment, UL power control can be taken into account as well. For example, power control (e.g., uplink power) aims to optimize UE 101 transmit power according to the following criteria: maximum throughput, limited interference (increase throughput for other UE's), and maximum battery lifetime. The conventional approach focuses on the UE's throughput as the optimization criteria. In this case, the UE 101 should transmit with maximum power except when its signal to interference ratio (SINR) is beyond the required SINR for the maximum modulation and coding scheme (MCS); in other words, there is no need to waste power when no further throughput can be obtained.

For example, in the scenario 600 of FIG. 6, a UE 101a uses more power than a UE 101d due to UL power control. Hence, a UE 101c perceives stronger interference from the UE 101a, even though the path loss from the UE 101a and the UE 101d to the UE 101c might be approximately the same. Accordingly, the measurements do not allow deducing a map of the node locations, unless the UL power control information is considered at the base station 103, which in turn adds complexity to the system—although UE 101 reporting of power headroom (maximum minus the actual power) is included already in LIE Rel'8. However, such a map is not needed, since the interference measurements already provide the information needed for coexistence of D2D with the cellular network.

Further, it is assumed that a UE 101c, the UE 101c, and the UE 101d have measured interference caused by each of the other UEs 101a-101d, and that this information is reported to the base station 103, using one of the processes of FIGS. 2-5. If 2-bit feedback is received from the UEs 101a-101d, the interference table at the base station 103 would be similar to Table 1, where each row corresponds to the interference reports from a given UE 101a-101d. It can be seen in Table 1 that the interference observed from the UEs 101a-101d is not symmetric (due to UL power control). In Table 1, no measurements are available from the UE 101a, but the other UEs 101b-101c have measured interference from the UE 101a transmissions. This represents the case where the UE 101a is a legacy terminal, which is not capable of performing and reporting interference measurements.

It is assumed that the UE 101b and the UE 101c are engaged in D2D communications. From Table 1, the UE 101c experiences significant interference from UE 101a, and hence the UE 101a and the UE 101c should not share resources. On the other hand, the pair (UE 101b, UE 101c) and the UE 101d perceive low interference from each other, and thus are good candidates for resource sharing. Moreover, it can be concluded that the UE 101b and the UE 101c are close by and require low power for D2D communication; this scenario suggests that resource sharing is possible.

Table 1 is an interference table at the base station 103 (e.g., quantized to 2 bits). The row indicates the interference victim and the column indicates the interference source

TABLE 1

|        | UE 101a | UE 101b | UE 101c | UE 101d |
|--------|---------|---------|---------|---------|
| UE 101b | 1 | — | 3 | 1 |
| UE 101c | 2 | 3 | — | 1 |
| UE 101d | 2 | 1 | 1 | — |

Similar conclusions can be drawn in the case of the interference information being quantized to only one bit, as shown in Table 2.

Again, the effect of UL power control is clear from the asymmetry in the table. In this case the only information missing is the quality of the link between the UE 101b and the UE 101c, even though this information can be estimated from the table due to the symmetry of the estimates of the UE 101b and the UE 101c with respect to each other. Table 2 enumerates an interference table at base station 103 quantized to 1 bit.

TABLE 2

|        | UE 101a | UE 101b | UE 101c | UE 101d |
|--------|---------|---------|---------|---------|
| UE 101b | 0 | — | 1 | 0 |
| UE 101c | 1 | 1 | — | 0 |
| UE 101d | 1 | 0 | 0 | — |

To evaluate the effects of the uplink power control on the scheduling decisions, the full interference matrix of Table 3 is considered. If measurements from the UE 101d are not available, and the UE 101a is establishing a D2D connection, the base station 103 may conclude that the UE 101a does not generate interference to the UE 101d (which is not true). This occurs because the UE 101d uses low power in the uplink since it is very close to the base station 103. However, it should be observed that if the UE 101a and the UE 101d share resources in downlink, the effect of the interference caused to the cellular connection of the UE 101d is indeed low, since it has a very good connection to base station 103. Also, if the UE 101a and the UE 101d share resources in uplink, interference caused to the cellular connection of the UE 101d can be controlled by applying power back-off relative to the normal UL transmission directed to the base station 103. Moreover, from Table 3 it is observed that the UE 101d does not generate interference on the D2D reception of the UE 101a.

Table 3 provides a full interference table at the base station 103 quantized to 2 bits. The row indicates the interference victim, and the column indicates the interference source.

TABLE 3

|        | UE 101a | UE 101b | UE 101c | UE 101d |
|--------|---------|---------|---------|---------|
| UE 101a | — | 0 | 1 | 0 |
| UE 101b | 1 | — | 3 | 1 |
| UE 101c | 2 | 3 | — | 1 |
| UE 101d | 2 | 1 | 1 | — |

Hence, the correct scheduling decisions can be made even without interference reports from terminals communicating only with the cellular network. This implies that the schemes of FIGS. 2-5 can operate well even when legacy terminals are present in the network or if measurements are not available from some terminals for any other reason.

According to one embodiment, the following design rules can also be used in order to improve the quality of scheduling and sharing decisions by the base station 103. First, the transmit power is requested from the UEs 101a-101d. This information is then used to properly weight the interference reports from other UEs 101a-101d. This is particularly relevant for the UEs 101 (e.g., the UE 101d) that are close to the base station 103. Second, smaller transmit power is applied to the D2D link that is sharing resources with a UE 101 whose interference reports are not available. Thirdly, dedicated resources can be used for D2D connection, if reports from cellular UEs 101 are not available.

If the full interference matrix is known, the base station 103 can make more accurate and sophisticated scheduling decisions. For example, if the UE 101a and the UE 101c engage in D2D communications, they will cause interference to the UE 101d (from the UE 101a) and to the UE 101b (from the UE 101c). In this case, the base station 103 may coordinate transmissions such that D2D transmissions from the UE 101a share resources with the UE 101b, while D2D transmissions from the UE 101c share resources with the UE 101d. It should be noted that such level of coordination of D2D transmissions might introduce large overhead to the system.

Figure 7B:
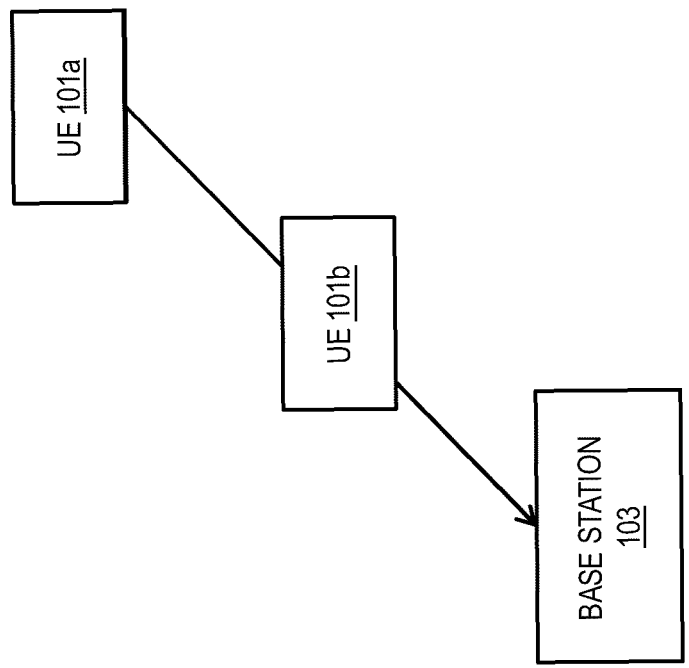
FIGS. 7A and 7B are diagrams of an exemplary communication system in which the user equipment provide timing estimates, according to various exemplary embodiments.
Figure 7A:
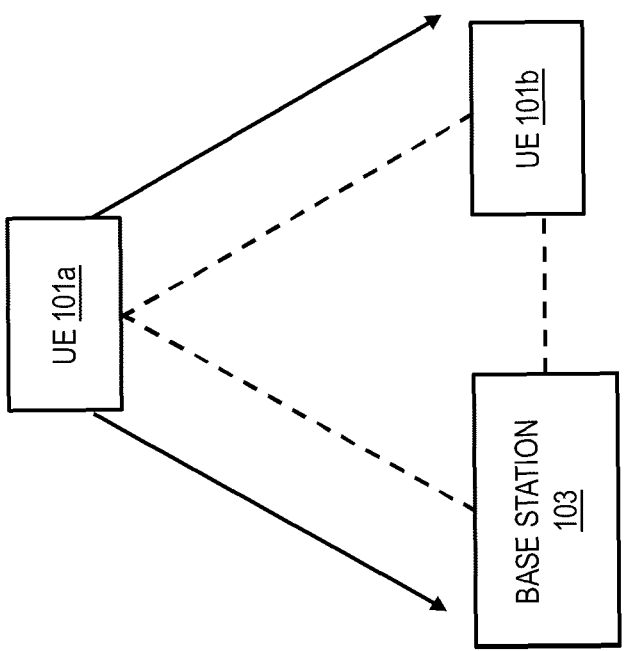

FIGS. 7A and 7B are diagrams of an exemplary communication system in which the user equipment provide timing estimates, according to various exemplary embodiments. It is noted that in addition to estimating a pilot power of another UE 101, the measuring UE 101 can also estimate its timing as well. For example, assuming that the UE 101a (to be measured) sends a signal at time $t_1$, which is equal to $t_0-TA_1$, where $t_0$ is the reference time at the base station 103, when the base station 103 is receiving the signal. In other words, $TA_1$ is the timing advance of the UE 101a. When the UE 101b is performing the measurement, the UE 101b knows its own $TA_2$, so that the UE 101b can perform a measurement at the time that the signal is expected to reach the base station 103.

However, the time when the signal reaches the UE 101b may be different. For example, if the two UEs 101a and 101b and the base station 103 form an equilateral triangle (as shown), the signal from the UE 101a reaches the UE 101b and the base station 103 simultaneously, as shown in FIG. 7A. However, if the UE 101b is on a line between the UE 101a and the base station 103, the signal from the UE 101a reaches the UE 101b at $t_0-TA_2$ as shown in FIG. 7B. In other cases (e.g., depending on the spatial arrangement of the UEs 101a-101b and the base station 103), the signal from the UE 101a is either later or earlier than the example of FIG. 7B. For example, the earliest time a signal can reach the UE 101b is $t_0$-maxTA, where maxTA is the maximum Timing Advance in the cell. This is realized when both the UEs 101a and 101b are at the cell border, and almost in the same location. The latest possible time is roughly $t_0$+maxTA, both in 3-sectorized and omni systems.

In one embodiment, timing for reception of signal from the UE 101a in the UE 101b depends on relative position of the UEs 101a-101b and the base station 103. In both cases, the signal is received at the UE 101b at $t_0-TA_2$. Three approaches are described for determining the timing of the measurement at either of the UEs 101a or 101b. In the first approach, the UE (e.g., either the UE 101a or 101b) may base a timing estimate on the base station 103 clock and on its own TA. In particular, if the own TA ($TA_2$) is small compared to maxTA, it is best to measure at $t_0-TA_2$. Also, if the own TA is large (i.e., close to maxTA), it is best to measure at a time $t_0+r*TA_2$, where r is a number between 0 and 1. This parameter may depend on the cellular deployment, and on how close $TA_2$ is to maxTA.

In the second approach, the UE (e.g., either the UE 101a or 101b) may base a timing estimate on the base station 103 clock, its own TA, and on the TA of the UE to be measured. By way of example, for the process 200 of FIG. 2, the base station 103 may signal the TAs of the UEs 101 to be measured.

Regarding the process 300 of FIG. 3, the base station may signal the TAs to be used when measuring the indicated resources.

As for the process 400 of FIG. 4, there may be a DL control channel where the TAs of all UEs 101 are indicated, which the measuring UE 101 may read.

Under the third approach, the UE 101 may measure the timing of the other UE 101. For example, it may be considered that at most x% of the pilot power may be lost due to timing error. Corresponding to this, a maximum measurement timing error maxErr is defined. The base station 103 may signal maxTA, so that the measuring UE 101 knows the earliest and latest possible arrival times of other-UE 101 signals. In one embodiment, if the difference of these is larger than twice maxErr, the UE 101 considers more than one timing, and selects the timing which gives the highest power.

In the above process, there may be significant errors in the timing of the measurement. Depending on the length of the cyclic prefix (CP), and the length of the pilot symbols, the timing error is a more or less serious problem. For example, if the CP is of the order of 5 us, distance differences up to 1.5 km may be easily tolerated. If the timing of the measurement is more in error than CP, the timing starts to degrade the reliability of the measurement. If d is the excess measurement timing error (error above CP, measured in units in the payload symbol duration), the wanted signal part of the received power is $(1-d)^2$, and the inter-symbol interference (ISI) and inter-carrier interference (ICI) arising from timing error is $1-(1-d)^2$. Hence half of the pilot power would be lost to ICI and ISI if $d=1-1/\sqrt{2}\approx 0.3$, i.e., if the measurement time difference is approximately equal to CP+0.3*payload. With LTE numerology, this would mean that with a measurement timing difference of ~25 us, corresponding to a distance difference of 7.5 km, half of the pilot power is lost. At measurement timing error CP+payload, corresponding to 21 km, all of the pilot power is lost.

From these computations, it is understood that if the disclosed approaches were to be used in a large LIE macro cell, the accuracy of the timing of the measurement becomes an issue. In that case, an implementation of timing measurement according to second approach or the third approach can be used. In smaller cells, the first approach is sufficient.

It should be noticed as well that if the timing differences of other UEs 101 (including both the one(s) measured and the possible non-measured) at the measuring UE 101 are larger than CP, orthogonality of the other UE 101 signals is lost. This lost can cause multiple access interference which may render the pilot power measurements unreliable.

Figure 8:
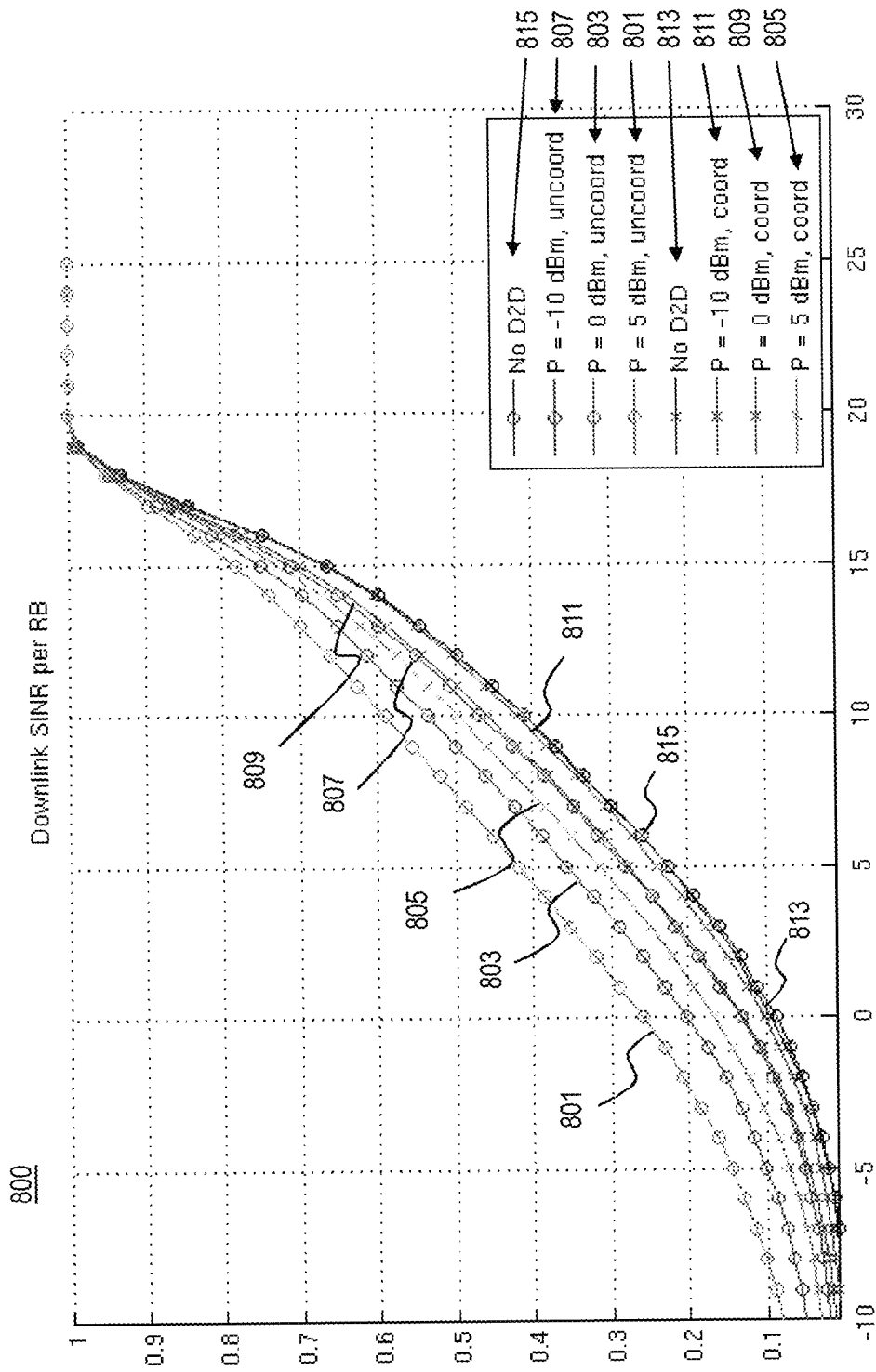
FIG. 8 is a graph showing performance when device-to-device (D2D) communication shares downlink resources.

FIG. 8 is a graph showing performance when device-to-device (D2D) communication shares downlink resources. The potential benefits of interference measurements can be observed in graph 800, where exemplary cumulative distribution functions (CDFs) 801-815 of the cellular DL SINR are shown. Table 4 shows the plots for the various scenarios:

TABLE 4

| Label | Description |
|---|---|
| Function 801 | P = 5 dBm, uncoordinated |
| Function 803 | P = 0 dBm, uncoordinated |
| Function 805 | P = 5 dBm, coordinated |
| Function 807 | P = −10 dBm, uncoordinated |
| Function 809 | P = 0 dBm, coordinated |
| Function 811 | P = −10 dBm, coordinated |
| Function 813 | No D2D |
| Function 815 | No D2D |

The CDFs 801-815 are shown for different levels of D2D transmit power, and for uncoordinated (e.g., when the base station 103 is not aware of interference to cellular UE 101) and coordinated transmissions (e.g., when the base station 103 uses the information of the interference to the cellular UE 101 when scheduling the cellular UEs 101). It can be seen that the same cellular DL SINR is achieved for coordinated transmissions with a D2D transmit power P=0 dBm and for uncoordinated transmissions with a D2D transmit power P=−10 dBm, thus representing a gain of 10 dB in the tolerable D2D transmission power. In graph 800, it is assumed that the path loss and shadow fading from all links are known at the base station 103, and performance degradation is expected in a practical scenario, but still most of the gains should be retained.

As mentioned, the described processes may be implemented in any number of radio networks.

Figure 9A:
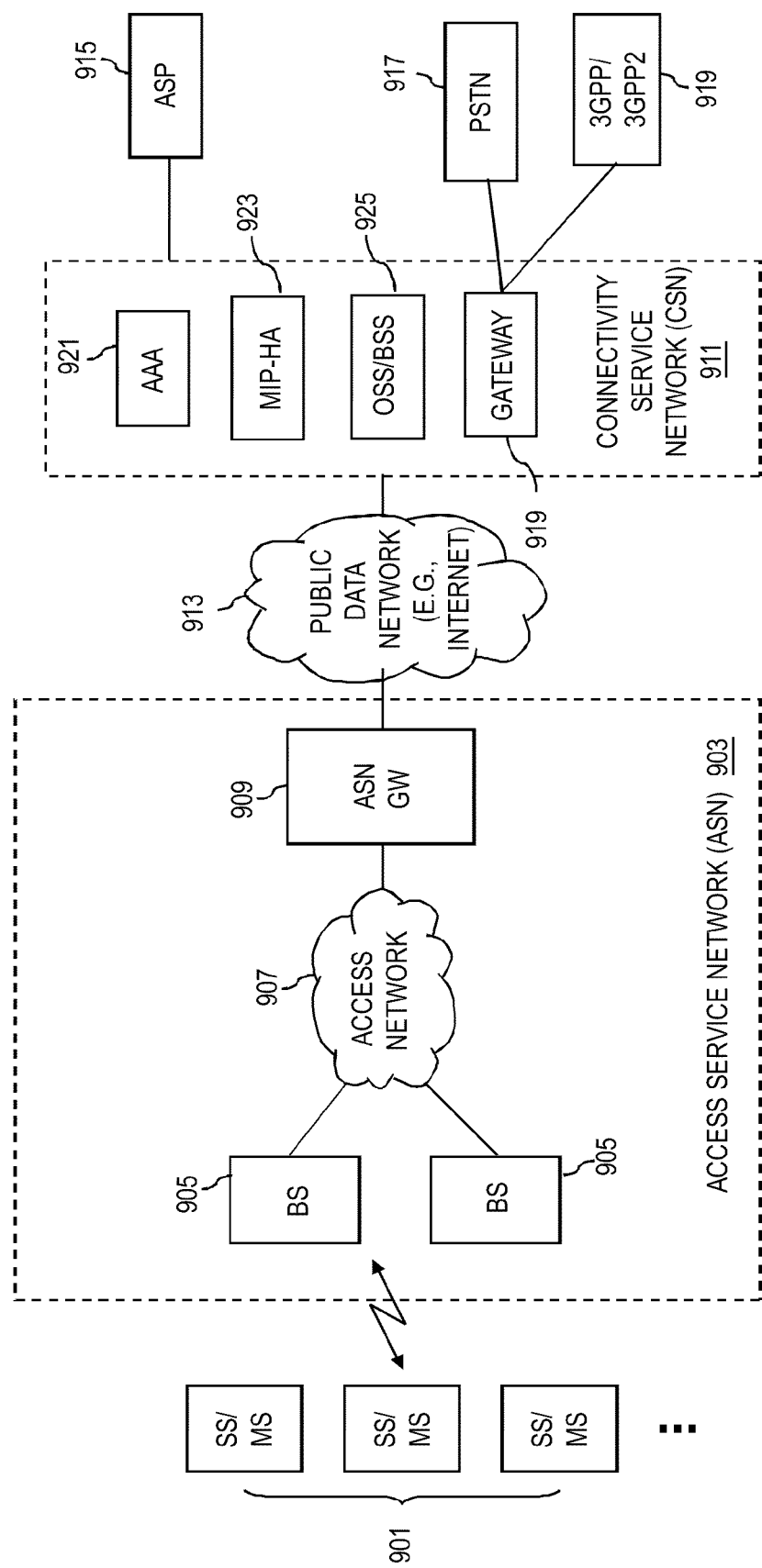
FIGS. 9A and 9B are diagrams of an exemplary WiMAX (Worldwide Interoperability for Microwave Access) architecture, in which the system of FIG. 1A can operate, according to various exemplary embodiments of the invention.
Figure 9B:
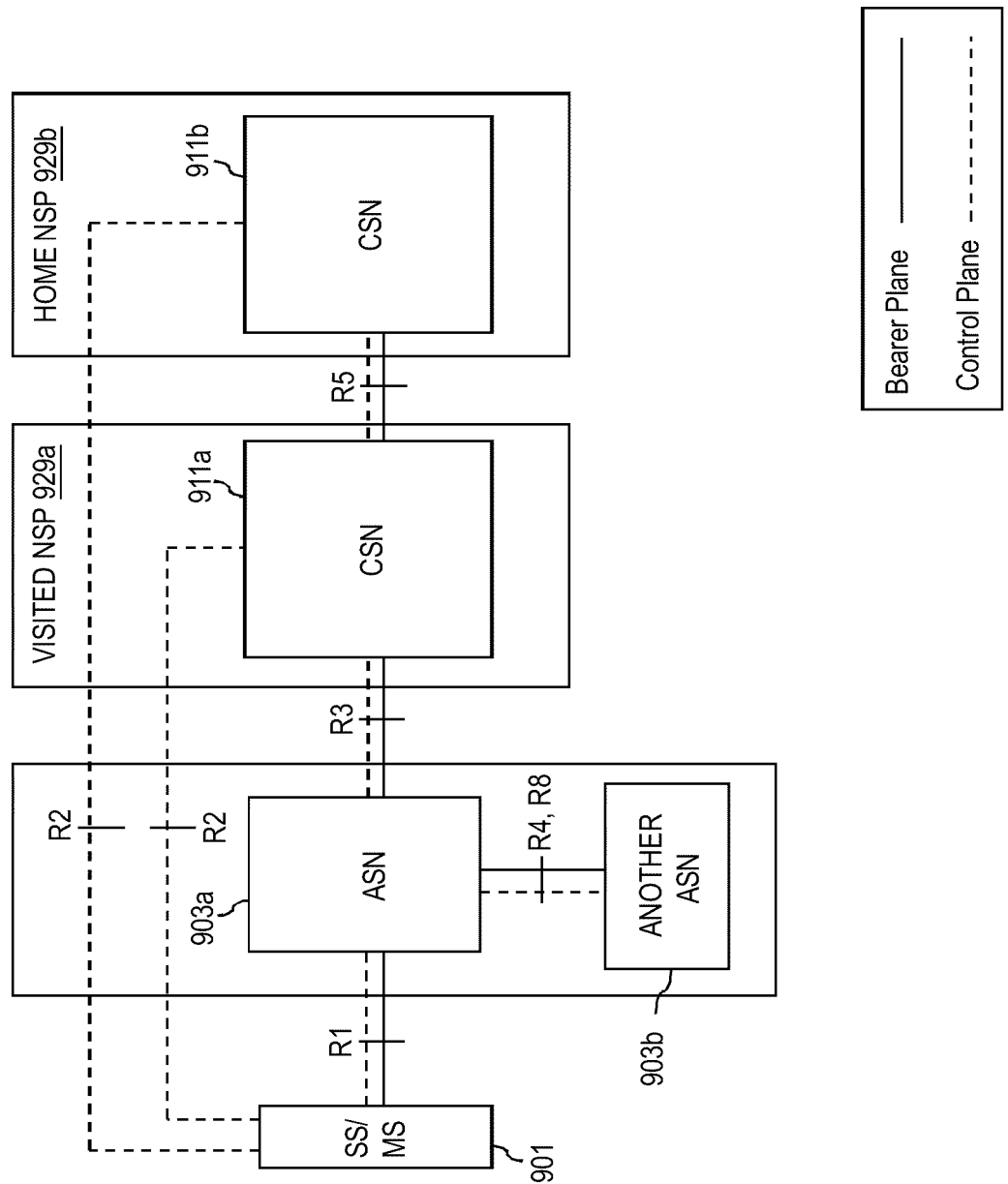

FIGS. 9A and 9B are diagrams of an exemplary WiMAX architecture, in which the system of FIG. 1A, according to various exemplary embodiments of the invention. The architecture shown in FIGS. 9A and 9B can support fixed, nomadic, and mobile deployments and be based on an Internet Protocol (IP) service model. Subscriber or mobile stations 901 can communicate with an access service network (ASN) 903, which includes one or more base stations (BS) 905. In this exemplary system, the BS 905, in addition to providing the air interface to the mobile stations 901, possesses such management functions as handoff triggering and tunnel establishment, radio resource management, quality of service (QoS) policy enforcement, traffic classification, DHCP (Dynamic Host Control Protocol) proxy, key management, session management, and multicast group management.

The base station 905 has connectivity to an access network 907. The access network 907 utilizes an ASN gateway 909 to access a connectivity service network (CSN) 911 over, for example, a data network 913. By way of example, the network 913 can be a public data network, such as the global Internet.

The ASN gateway 909 provides a Layer 2 traffic aggregation point within the ASN 903. The ASN gateway 909 can additionally provide intra-ASN location management and paging, radio resource management and admission control, caching of subscriber profiles and encryption keys, AAA client functionality, establishment and management of mobility tunnel with base stations, QoS and policy enforcement, foreign agent functionality for mobile IP, and routing to the selected CSN 911.

The CSN 911 interfaces with various systems, such as application service provider (ASP) 915, a public switched telephone network (PSTN) 917, and a Third Generation Partnership Project (3GPP)/3GPP2 system 919, and enterprise networks (not shown).

The CSN 911 can include the following components: Access, Authorization and Accounting system (AAA) 921, a mobile IP-Home Agent (MIP-HA) 923, an operation support system (OSS)/business support system (BSS) 925, and a gateway 927. The AAA system 921, which can be implemented as one or more servers, provide support authentication for the devices, users, and specific services. The CSN 911 also provides per user policy management of QoS and security, as well as IP address management, support for roaming between different network service providers (NSPs), location management among ASNs.

FIG. 9B shows a reference architecture that defines interfaces (i.e., reference points) between functional entities capable of supporting various embodiments of the invention. The WiMAX network reference model defines reference points: R1, R2, R3, R4, and R5. R1 is defined between the SS/MS 901 and the ASN 903a; this interface, in addition to the air interface, includes protocols in the management plane. R2 is provided between the SS/MS 901 and a CSN (e.g., CSN 911a and 911b) for authentication, service authorization, IP configuration, and mobility management. The ASN 903a and CSN 911a communicate over R3, which supports policy enforcement and mobility management.

R4 is defined between ASNs 903a and 903b to support inter-ASN mobility. R5 is defined to support roaming across multiple NSPs (e.g., visited NSP 929a and home NSP 929b).

As mentioned, other wireless systems can be utilized, such as 3GPP LIE, as next explained.

FIGS. 10A-10D are diagrams of communication systems having exemplary long-term evolution (LIE) architectures, in which the user equipment (UE) and the base station of FIG. 1 can operate, according to various exemplary embodiments of the invention. By way of example (shown in FIG. 10A), a base station (e.g., destination node) and a user equipment (UE) (e.g., source node) can communicate in system 1000 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 10A:
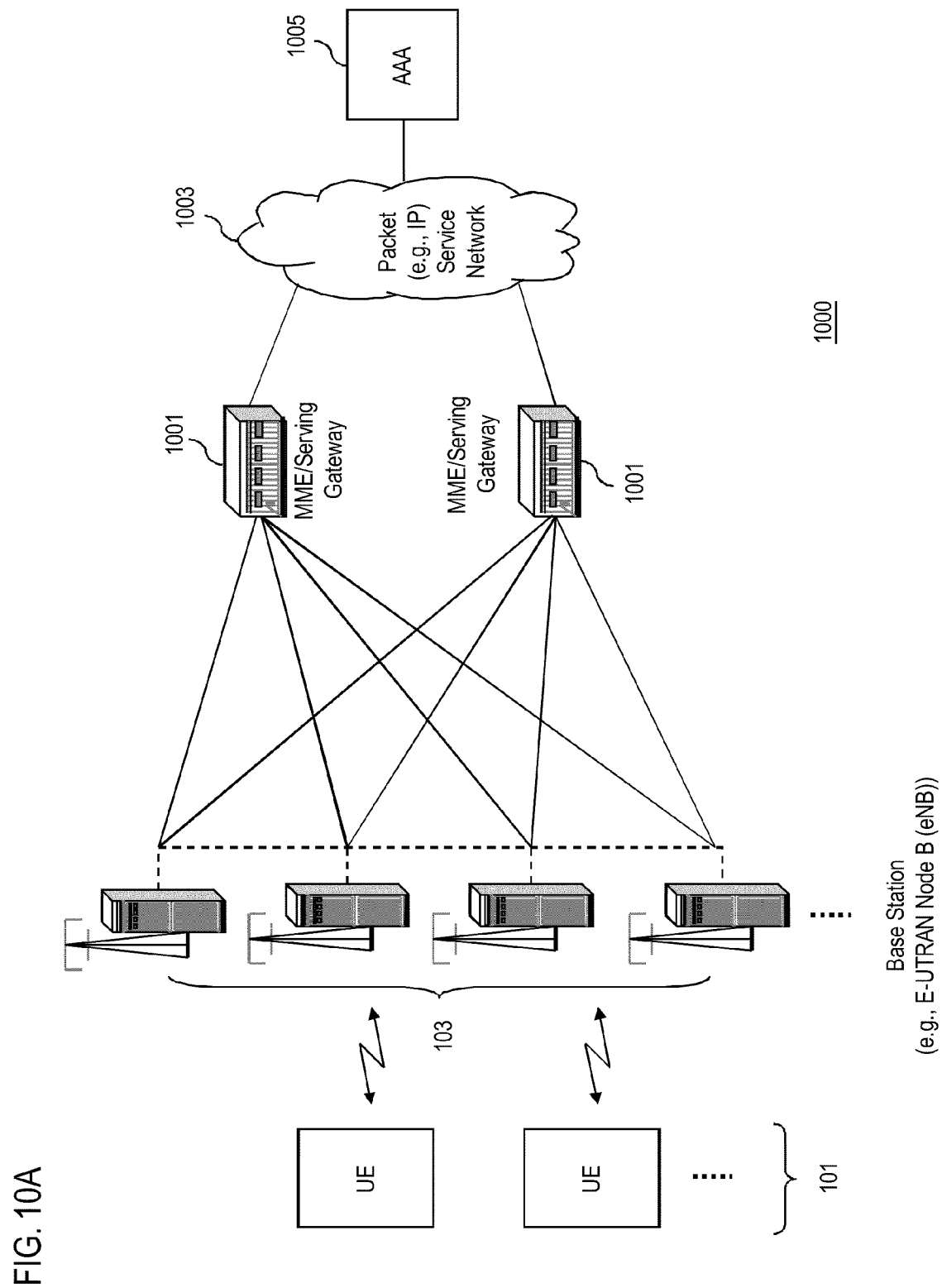
FIGS. 10A-10D are diagrams of communication systems having exemplary long-term evolution (LIE) architectures, in which the user equipment (UE) and the base station of FIG. 1A can operate, according to various exemplary embodiments of the invention.

The communication system 1000 is compliant with 3GPP LIE, entitled "Long Term Evolution of the 3GPP Radio Technology" (which is incorporated herein by reference in its entirety). As shown in FIG. 10A, one or more user equipment (UEs) communicate with a network equipment, such as a base station 103, which is part of an access network (e.g., WiMAX (Worldwide Interoperability for Microwave Access), 3GPP LIE (or E-UTRAN), etc.). Under the 3GPP LIE architecture, base station 103 is denoted as an enhanced Node B (eNB).

MME (Mobile Management Entity)/Serving Gateways 1001 are connected to the eNBs 103 in a full or partial mesh configuration using tunneling over a packet transport network (e.g., Internet Protocol (IP) network) 1003. Exemplary functions of the MME/Serving GW 1001 include distribution of paging messages to the eNBs 103, termination of U-plane packets for paging reasons, and switching of U-plane for support of UE mobility. Since the GWs 1001 serve as a gateway to external networks, e.g., the Internet or private networks 1003, the GWs 1001 include an Access, Authorization and Accounting system (AAA) 1005 to securely determine the identity and privileges of a user and to track each user's activities. Namely, the MME Serving Gateway 1001 is the key control-node for the LIE access-network and is responsible for idle mode UE tracking and paging procedure including retransmissions. Also, the MME 1001 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 10B:
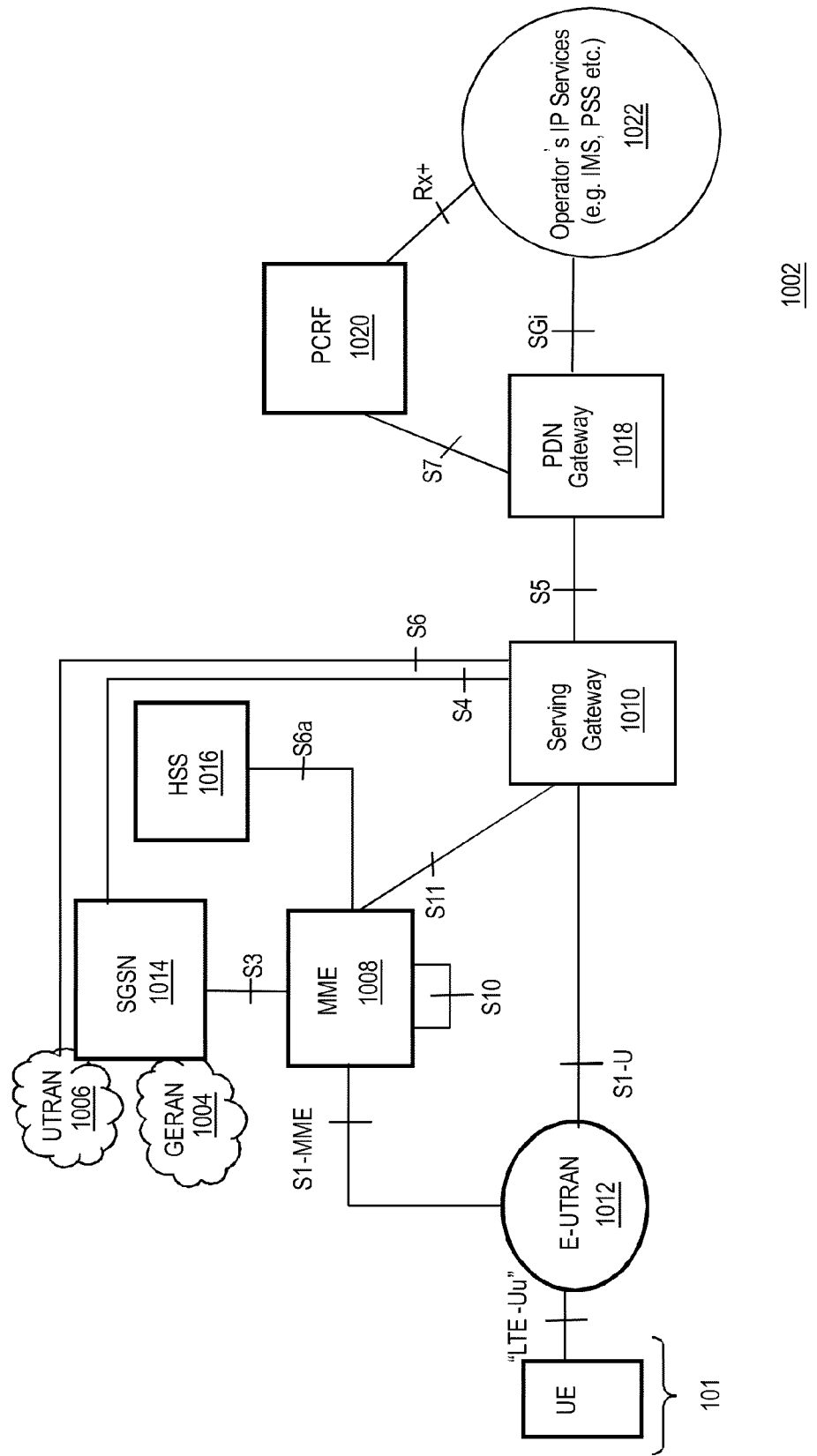

In FIG. 10B, a communication system 1002 supports GERAN (GSM/EDGE radio access) 1004, and UTRAN 1006 based access networks, E-UTRAN 1012 and non-3GPP (not shown) based access networks, and is more fully described in TR 23.882, which is incorporated herein by reference in its entirety. A key feature of this system is the separation of the network entity that performs control-plane functionality (MME 1008) from the network entity that performs bearer-plane functionality (Serving Gateway 1010) with a well defined open interface between them S11. Since E-UTRAN 1012 provides higher bandwidths to enable new services as well as to improve existing ones, separation of MME 1008 from Serving Gateway 1010 implies that Serving Gateway 1010 can be based on a platform optimized for signaling transactions. This scheme enables selection of more cost-effective platforms for, as well as independent scaling of, each of these two elements. Service providers can also select optimized topological locations of Serving Gateways 1010 within the network independent of the locations of MMEs 1008 in order to reduce optimized bandwidth latencies and avoid concentrated points of failure.

As seen in FIG. 10B, the E-UTRAN (e.g., eNB) 1012 interfaces with UE 101 via LTE-Uu. The E-UTRAN 1012 supports LTE air interface and includes functions for radio resource control (RRC) functionality corresponding to the control plane MME 1008. The E-UTRAN 1012 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 1008, as a key control node, is responsible for managing mobility UE identifies and security parameters and paging procedure including retransmissions. The MME 1008 is involved in the bearer activation/deactivation process and is also responsible for choosing Serving Gateway 1010 for the UE 101. MME 1008 functions include Non Access Stratum (NAS) signaling and related security. MME 1008 checks the authorization of the UE 101 to camp on the service provider's Public Land Mobile Network (PLMN) and enforces UE 101 roaming restrictions. The MME 1008 also provides the control plane function for mobility between LIE and 2G/3G access networks with the S3 interface terminating at the MME 1008 from the SGSN (Serving GPRS Support Node) 1014.

The SGSN 1014 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 1008 and HSS (Home Subscriber Server) 1016. The S10 interface between MMEs 1008 provides MME relocation and MME 1008 to MME 1008 information transfer. The Serving Gateway 1010 is the node that terminates the interface towards the E-UTRAN 1012 via S1-U.

The S1-U interface provides a per bearer user plane tunneling between the E-UTRAN 1012 and Serving Gateway 1010. It contains support for path switching during handover between eNBs 103. The S4 interface provides the user plane with related control and mobility support between SGSN 1014 and the 3GPP Anchor function of Serving Gateway 1010.

The S12 is an interface between UTRAN 1006 and Serving Gateway 1010. Packet Data Network (PDN) Gateway 1018 provides connectivity to the UE 101 to external packet data networks by being the point of exit and entry of traffic for the UE 101. The PDN Gateway 1018 performs policy enforcement, packet filtering for each user, charging support, lawful interception and packet screening. Another role of the PDN Gateway 1018 is to act as the anchor for mobility between 3GPP and non-3GPP technologies such as WiMax and 3GPP2 (CDMA 1X and EvDO (Evolution Data Only)).

The S7 interface provides transfer of QoS policy and charging rules from PCRF (Policy and Charging Role Function) 1020 to Policy and Charging Enforcement Function (PCEF) in the PDN Gateway 1018. The SGi interface is the interface between the PDN Gateway and the operator's IP services including packet data network 1022. Packet data network 1022 may be an operator external public or private packet data network or an intra operator packet data network, e.g., for provision of IMS (IP Multimedia Subsystem) services. Rx+ is the interface between the PCRF and the packet data network 1022.

Figure 10C:
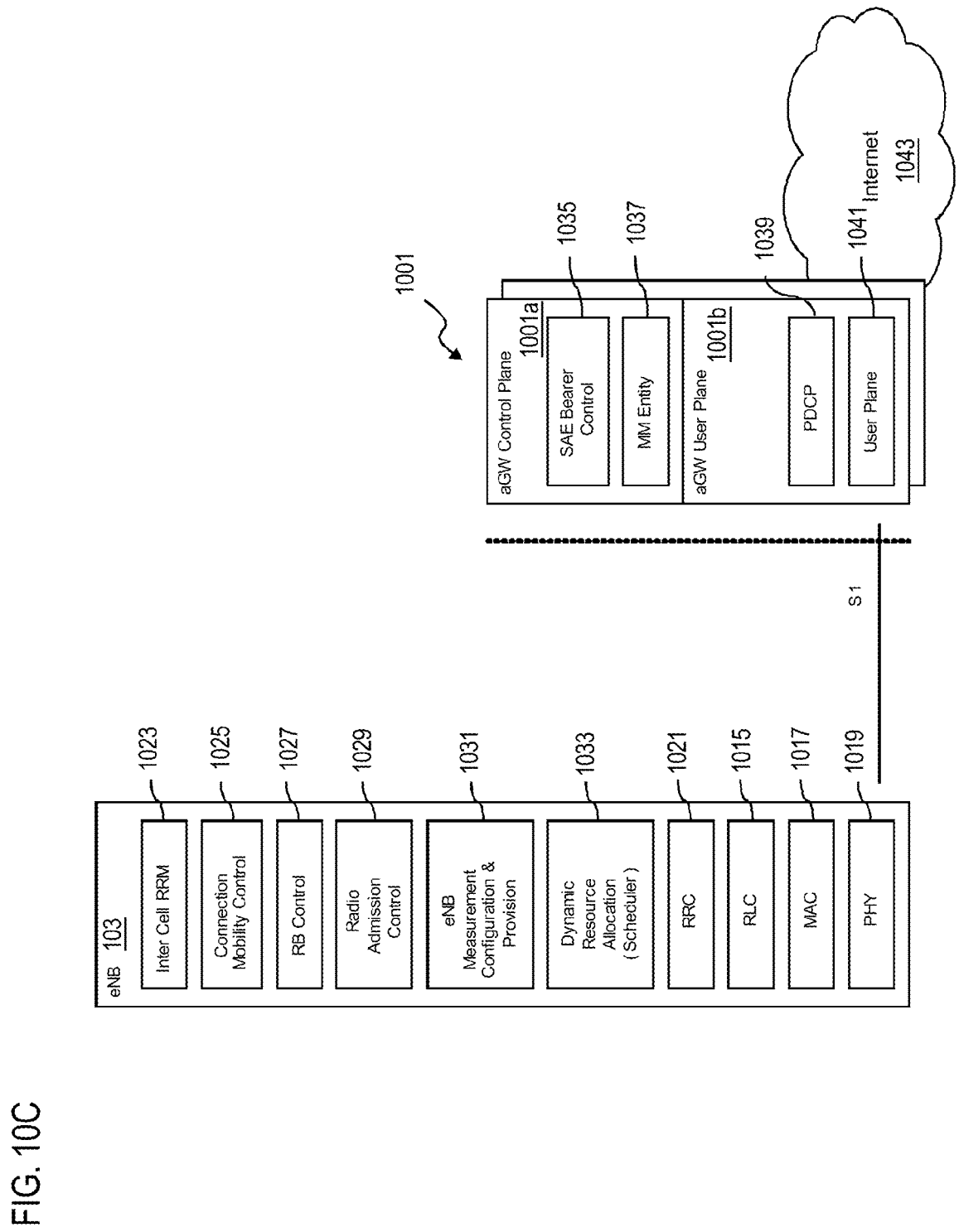

As seen in FIG. 10C, the eNB 103 utilizes an E-UTRA (Evolved Universal Terrestrial Radio Access) (user plane, e.g., RLC (Radio Link Control) 1015, MAC (Media Access Control) 1017, and PHY (Physical) 1019, as well as a control plane (e.g., RRC 1021)). The eNB 103 also includes the following functions: Inter Cell RRM (Radio Resource Management) 1023, Connection Mobility Control 1025, RB (Radio Bearer) Control 1027, Radio Admission Control 1029, eNB Measurement Configuration and Provision 1031, and Dynamic Resource Allocation (Scheduler) 1033.

The eNB 103 communicates with the aGW 1001 (Access Gateway) via an S1 interface. The aGW 1001 includes a User Plane 1001*a* and a Control plane 1001*b*. The control plane 1001*b* provides the following components: SAE (System Architecture Evolution) Bearer Control 1035 and MM (Mobile Management) Entity 1037. The user plane 1001*b* includes a PDCP (Packet Data Convergence Protocol) 1039 and a user plane functions 1041. It is noted that the functionality of the aGW 1001 can also be provided by a combination of a serving gateway (SGW) and a packet data network (PDN) GW. The aGW 1001 can also interface with a packet network, such as the Internet 1043.

Figure 10D:
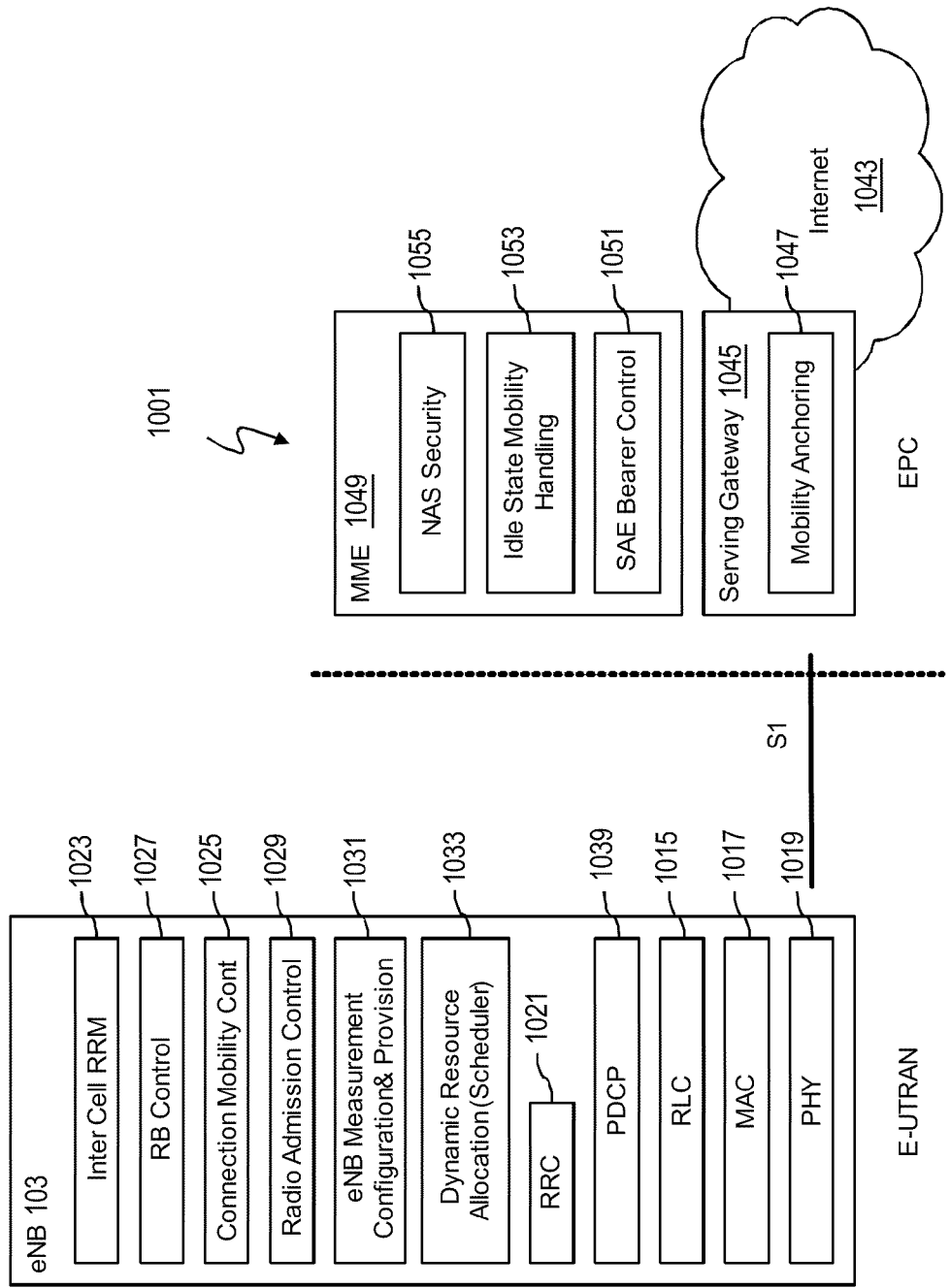

In an alternative embodiment, as shown in FIG. 10D, the PDCP (Packet Data Convergence Protocol) functionality can reside in the eNB 103 rather than the GW 1001. Other than this PDCP capability, the eNB functions of FIG. 10C are also provided in this architecture.

In the system of FIG. 10D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 103 interfaces via the S1 to the Serving Gateway 1045, which includes a Mobility Anchoring function 1047. According to this architecture, the MME (Mobility Management Entity) 1049 provides SAE (System Architecture Evolution) Bearer Control 1051, Idle State Mobility Handling 1053, and NAS (Non-Access Stratum) Security 1055.

One of ordinary skill in the art would recognize that the processes for interference sensing may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 11:
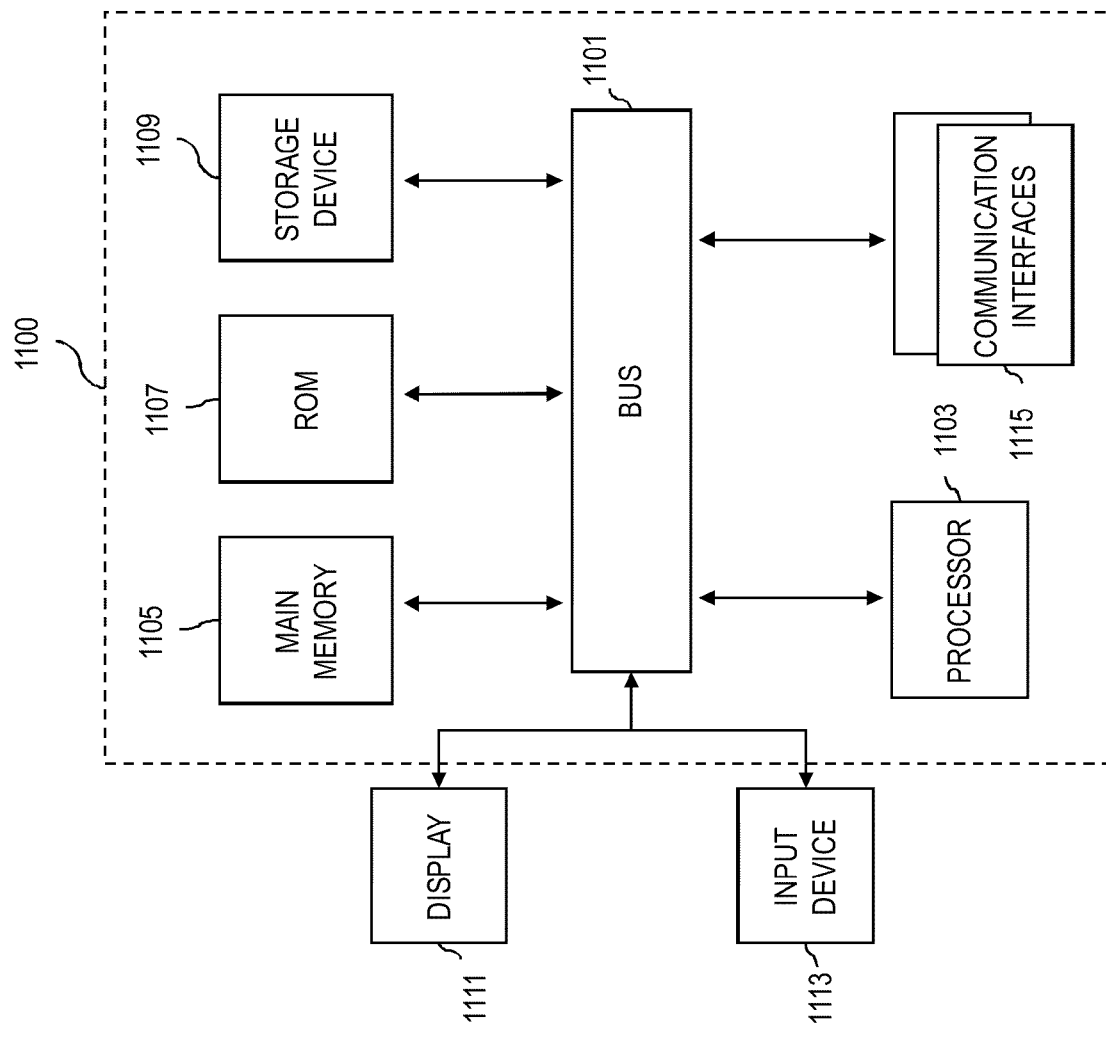
FIG. 11 is a diagram of hardware that can be used to implement an embodiment of the invention.

FIG. 11 illustrates exemplary hardware upon which various embodiments of the invention can be implemented. A computing system 1100 includes a bus 1101 or other communication mechanism for communicating information and a processor 1103 coupled to the bus 1101 for processing information. The computing system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computing system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computing system 1100 may be coupled via the bus 1101 to a display 1111, such as a liquid crystal display, or active matrix display, for displaying information to a user. An input device 1113, such as a keyboard including alphanumeric and other keys, may be coupled to the bus 1101 for communicating information and command selections to the processor 1103. The input device 1113 can include a cursor control, such as a mouse, a trackball, or cursor direction keys, for communicating direction information and command selections to the processor 1103 and for controlling cursor movement on the display 1111.

According to various embodiments of the invention, the processes described herein can be provided by the computing system 1100 in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1100 also includes at least one communication interface 1115 coupled to bus 1101. The communication interface 1115 provides a two-way data communication coupling to a network link (not shown). The communication interface 1115 sends and receives electrical, electromagnetic, or optical signals that carry digital data streams representing various types of information. Further, the communication interface 1115 can include peripheral interface devices, such as a Universal Serial Bus (USB) interface, a PCMCIA (Personal Computer Memory Card International Association) interface, etc.

The processor 1103 may execute the transmitted code while being received and/or store the code in the storage device 1109, or other non-volatile storage for later execution. In this manner, the computing system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
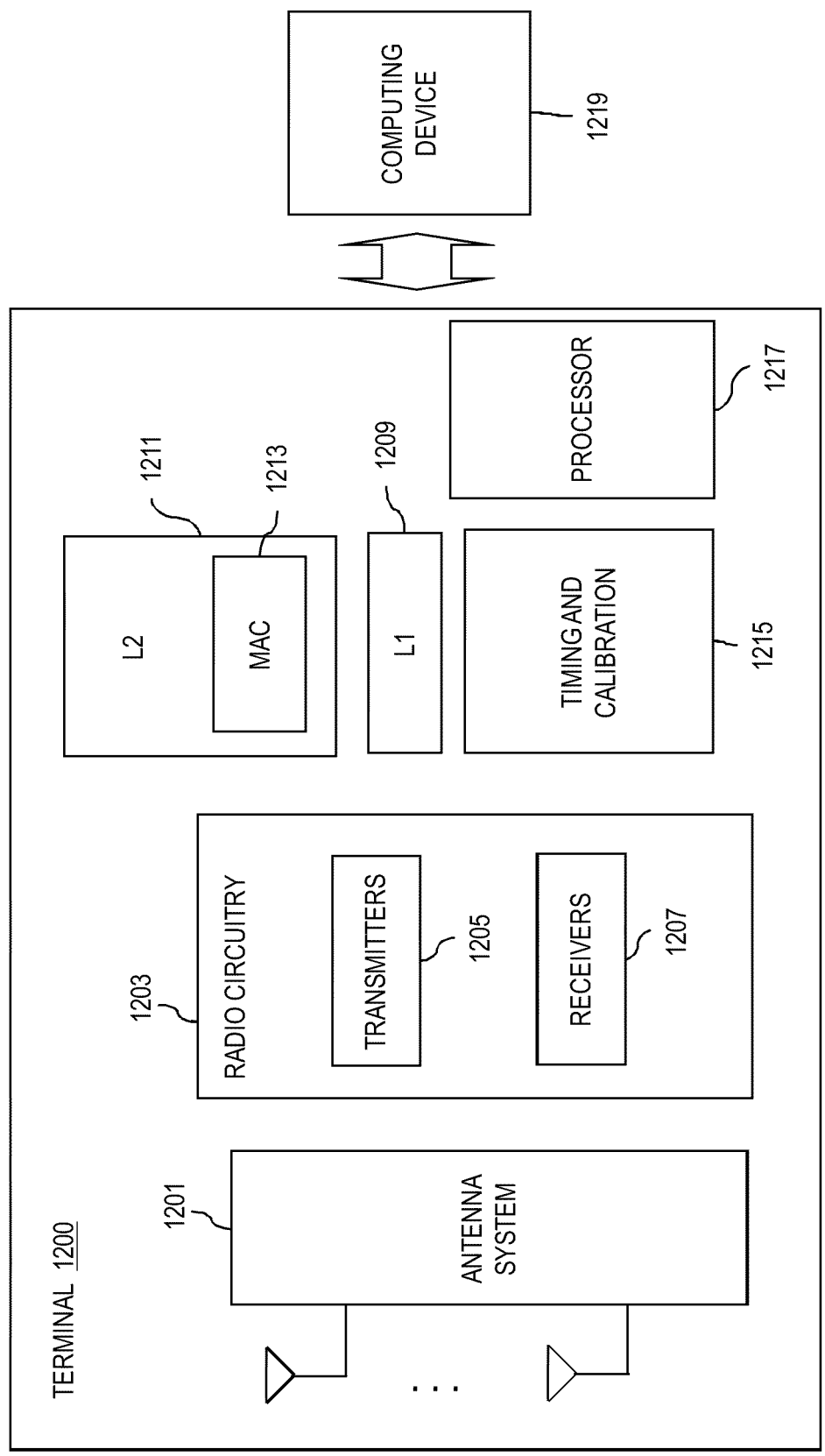
FIG. 12 is a diagram of exemplary components of a user terminal configured to operate in the systems of FIGS. 9 and 10, according to an embodiment of the invention.

FIG. 12 is a diagram of exemplary components of a user terminal configured to operate in the systems of FIGS. 5 and 6, according to an embodiment of the invention. A user terminal 1200 includes an antenna system 1201 (which can utilize multiple antennas) to receive and transmit signals. The antenna system 1201 is coupled to radio circuitry 1203, which includes multiple transmitters 1205 and receivers 1207. The radio circuitry encompasses all of the Radio Frequency (RF) circuitry as well as base-band processing circuitry. As shown, layer-1 (L1) and layer-2 (L2) processing are provided by units 1209 and 1211, respectively. Optionally, layer-3 functions can be provided (not shown). L2 unit 1211 can include module 1213, which executes all Medium Access Control (MAC) layer functions. A timing and calibration module 1215 maintains proper timing by interfacing, for example, an external timing reference (not shown). Additionally, a processor 1217 is included. Under this scenario, the user terminal 1200 communicates with a computing device 1219, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the claims. Although features of the invention are expressed in certain combinations among the claims, it is contemplated that these features can be arranged in any combination and order.

What is claimed is:

1. A method comprising:
generating at a base station a control signal to instruct a plurality of user devices to perform measurement relating to interference or path loss between the user devices;
receiving at the base station measurement information from the user devices, wherein the measurement information includes power information;
classifying at the base station the measurement information from the user devices based on the power information; and
determining at the base station, based on the measurement information, a classification of the resources for a device to device (D2D) communication between user devices, wherein the resources are to be scheduled to provide direct communication D2D via a direct wireless connection between two of the user devices; and when the base station determines measurement information is not available from either of the user devices, the base station may instruct the user devices with no measurement information to use a dedicated resource to establish a D2D connection.

2. A method of claim 1, further comprising:
determining that the measurement information is not available for one of the two user devices; and
instructing the one user device with no measurement information to use the dedicated resource to establish the direct wireless connection to the other one of the two user devices.

3. A method of claim 1, further comprising:
receiving identities of the user devices determined from a control channel; and
transmitting, to the user devices, one of a list of the identities of the user devices or a list of resources on which to perform the measurement.

4. A method of claim 1, further comprising:
determining an optimal timing for the measurement based on timing advance of a measuring of one of the user devices and of the other user devices to be measured.

5. A method of claim 1, wherein the resources are associated with a common band for establishing at least one of a downlink or an uplink, and the measurement is performed over a randomly selected portion of the resources or all of the resources.

6. A method of claim 1, wherein the base station and the user devices are configured to communicate over a cellular network, and
the resources are scheduled to be shared by the direct wireless connection and communication over the cellular network, when the interference or path loss is below a threshold value.

7. A method of claim 6, wherein the user devices include one or more mobile devices, and
wherein either the direct wireless connection causes the interference or path loss upon a cellular connection between the base station and one of the user devices, or the cellular connection causes the interference or path loss upon the direct wireless connection.

8. A method of claim 1, further comprising:
determining, based on the measurement information, communication over a cellular network between another two of the user devices either causing no interference on the direct wireless connection or causing the interference that is below a threshold value; and
in response to the determination, instructing one of the two user devices to share a resource used by the communication over the cellular network to establish the direct wireless connection.

9. A method of claim 1, wherein the power information includes one or more power densities relative to a power density of one of the user devices, one or more power densities relative to a power density received via the direct wireless connection, or one or more power densities relative to a power density received by the base station, or a combination thereof.

10. An apparatus comprising:
at least one processor; and
at least one memory including computer program code for one or more programs,
the at least one memory and the computer program code configured to, with the at least one processor, cause the apparatus to perform at least the following,
generate a control signal to instruct a plurality of user devices to perform measurement relating to interference or path loss between the user devices,
receive measurement information from the user devices, wherein the measurement information includes power information;
classify the measurement information from the user devices based on the power information; and
determine, based on the measurement information, a classification of the resources for a device to device (D2D) communication between user devices, wherein resources are to be scheduled to provide direct communication via a direct wireless connection between two of the user devices; and when the apparatus determines measurement information is not available from either of the user devices, the apparatus may instruct the user devices with no measurement information to use a dedicated resource to establish a D2D connection.

11. An apparatus of claim 10, wherein the apparatus is further caused to: determine that the measurement information is not available for one of the two user devices and to instruct the one user device with no measurement information to use the dedicated resource to establish the direct wireless connection to the other one of the two user devices.

12. An apparatus of claim 10, wherein the apparatus is further caused to: receive identities of the user devices determined from a control channel and to transmit, to the user devices, one of a list of the identities of the user devices or a list of resources on which to perform the measurement.

13. An apparatus of claim 10, wherein the apparatus is further caused to: determine an optimal timing for the measurement based on timing advance of a measuring station and of the user devices to be measured.

14. An apparatus of claim 10, wherein the resources are associated with a common band for establishing at least one of a downlink or an uplink, and the measurement is performed over a randomly selected portion of the resources or all of the resources.

15. An apparatus of claim 10, wherein the apparatus is a base station operating over a cellular network, and
the resources are scheduled to be shared by the direct wireless connection and communication over the cellular network, when the interference or path loss is below a threshold value.

16. A method comprising:
receiving at a user device a control signal from a base station;
performing at the user device measurement of interference or path loss in response to the control signal;
initiating transmission of measurement information from the user device to the base station, wherein the measurement information includes power information; and
receiving at the user device a resource allocation message specifying whether resources can be utilized to establish direct communication via a direct wireless connection from the user device to another user device, wherein whether the resources are to be scheduled to provide the direct communication is determined, based on the measurement information and a classification of the resources for a device to device (D2D) communication between user devices;
classifying the measurement information that is based on the power information; and when the base station determines measurement information is not available from either of the user devices, the base station may instruct the user devices with no measurement information to use a dedicated resource to establish a D2D connection.

17. A method of claim 16, wherein the resources are associated with a common band for establishing at least one of a downlink or an uplink, and the measurement is performed over a randomly selected portion of the resources or all of the resources.

* * * * *